United States Patent
Fukami et al.

(10) Patent No.: US 10,012,123 B2
(45) Date of Patent: Jul. 3, 2018

(54) EXHAUST DEVICE OF ENGINE

(71) Applicant: NISSAN MOTOR CO., LTD., Yokohama-shi, Kanagawa (JP)

(72) Inventors: Toru Fukami, Kanagawa (JP); Satoshi Ogihara, Kanagawa (JP); Yasukimi Toda, Kanagawa (JP); Hiroyuki Nagai, Kanagawa (JP); Shinichirou Mizoguchi, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 121 days.

(21) Appl. No.: 15/129,935

(22) PCT Filed: Mar. 25, 2015

(86) PCT No.: PCT/JP2015/059197
§ 371 (c)(1),
(2) Date: Sep. 28, 2016

(87) PCT Pub. No.: WO2015/151969
PCT Pub. Date: Oct. 8, 2015

(65) Prior Publication Data
US 2017/0138241 A1 May 18, 2017

(30) Foreign Application Priority Data

Apr. 4, 2014 (JP) .................... 2014-078161
Jul. 25, 2014 (JP) .................... 2014-152261

(51) Int. Cl.
*F01N 3/28* (2006.01)
*F01N 5/02* (2006.01)
(Continued)

(52) U.S. Cl.
CPC ....... *F01N 3/2889* (2013.01); *B01D 53/9454* (2013.01); *F01N 3/101* (2013.01);
(Continued)

(58) Field of Classification Search
CPC .......... F01N 3/2889; F01N 3/101; F01N 5/02; F01N 2240/20; B01D 53/9454; F01P 3/18; F01P 11/14; F01P 2011/205
See application file for complete search history.

(56) References Cited

U.S. PATENT DOCUMENTS 4,359,863 A * 11/1982 Virk .................... F01N 3/0253
422/169
2005/0279484 A1 * 12/2005 Vincent .............. B60H 1/00521
165/78

(Continued)

FOREIGN PATENT DOCUMENTS

JP  S63-110615 U   7/1988
JP  2008-57820 A   3/2008
(Continued)

*Primary Examiner* — Patrick Maines
(74) *Attorney, Agent, or Firm* — Drinker Biddle & Reath LLP

(57) ABSTRACT

An exhaust device of an engine, with an exhaust path to lead exhaust gas discharged from the engine to outside, the exhaust device comprising: an exhaust heat collector being configured to collect heat from the exhaust gas, and a cooling part being configured to cool down the exhaust heat collecting part from an outer peripheral side via a cooling fluid; and an exhaust gas flow controlling member in a cylindrical shape, comprising an inlet part and an outlet part where the inflow of the exhaust gas is discharged to an upstream side of the exhaust heat collecting part. An opening diameter of the outlet part is arranged to be smaller than an outer diameter of the exhaust heat collecting part. The exhaust gas flow controlling member is placed so that an open end of the outlet part opposes a central portion of an upstream end plane of the exhaust heat collecting part. The open end of the outlet part and the upstream end plane of the exhaust heat collecting part are a predetermined distance apart.

17 Claims, 17 Drawing Sheets

(51) Int. Cl.
- *F01N 3/10* (2006.01)
- *F01P 3/18* (2006.01)
- *F01P 11/14* (2006.01)
- *B01D 53/94* (2006.01)
- *F01P 11/20* (2006.01)

(52) U.S. Cl.
CPC ............... *F01N 5/02* (2013.01); *F01P 3/18* (2013.01); *F01P 11/14* (2013.01); *F01N 2240/20* (2013.01); *F01P 2011/205* (2013.01)

(56) References Cited

U.S. PATENT DOCUMENTS

| | | | |
|---|---|---|---|
| 2008/0053649 A1* | 3/2008 | Muramatsu | B60H 1/025 165/272 |
| 2010/0154758 A1* | 6/2010 | Schneider | G01F 1/44 123/568.12 |
| 2010/0251702 A1* | 10/2010 | Shikazono | F01N 5/02 60/320 |
| 2013/0037235 A1 | 2/2013 | Sakabe et al. | |
| 2013/0087405 A1 | 4/2013 | Uchino et al. | |

FOREIGN PATENT DOCUMENTS

| | | | |
|---|---|---|---|
| JP | 2008-069750 A | | 3/2008 |
| JP | 2009-013838 A | | 1/2009 |
| JP | 2011-169514 A | | 9/2011 |
| JP | 2012-140927 A | | 7/2012 |
| JP | 2012140927 A | * | 7/2012 |
| JP | 2013-083161 A | | 5/2013 |

\* cited by examiner

EXHAUST DEVICE OF ENGINE

TECHNICAL FIELD

The present invention relates to an exhaust device of an engine.

BACKGROUND ART

JP2011-169514A discloses an exhaust device, having an exhaust path, in which exhaust gas discharged from an engine flows, and an exhaust heat collector, which is provided in the exhaust path, and which collects heat from the exhaust gas by using cooling water. The heat collected with this exhaust heat collector is used to warm up the engine, to provide heating, and so on.

SUMMARY OF INVENTION

The above-described exhaust heat collector provided in the exhaust device is a device to draw heat away from the exhaust gas that passes the exhaust heat collecting part, by using cooling water. Consequently, when the engine enters high load and high engine revolution speed operating states and the amount of exhaust gas flow from the engine increases, the amount of exhaust heat to be collected by the exhaust heat collector increases. However, with an exhaust device of this kind, there is a problem that, if the engine operating states at high load and high engine revolution speed continue for a while, the temperature of the cooling water (cooling fluid) becomes too high, resulting in an overheat condition.

The present invention has been made in view of the above, and it is therefore an object of the present invention to provide an exhaust device of an engine, which can prevent the temperature of the cooling fluid for use in the exhaust heat collector from becoming too high.

According to one embodiments of the current invention, an exhaust device of an engine, with an exhaust path to lead exhaust gas discharged from the engine to outside, the exhaust device comprising: an exhaust heat collector, comprising an exhaust heat collecting part being configured to collect heat from the exhaust gas flowing in the exhaust path, and a cooling part being configured to cool down the exhaust heat collecting part from an outer peripheral side via a cooling fluid; and an exhaust gas flow controlling member in a cylindrical shape, comprising an inlet part which the exhaust gas flows into, and an outlet part where the inflow of the exhaust gas is discharged to an upstream side of the exhaust heat collecting part. An opening diameter of the outlet part of the exhaust gas flow controlling member is arranged to be smaller than an outer diameter of the exhaust heat collecting part. The exhaust gas flow controlling member is placed so that an open end of the outlet part opposes a central portion of an upstream end plane of the exhaust heat collecting part. The open end of the outlet part and the upstream end plane of the exhaust heat collecting part are a predetermined distance apart.

DESCRIPTION OF EMBODIMENTS

Now, embodiments of the present invention will be described below with reference to the accompanying drawings.

First Embodiment

Figure 1:
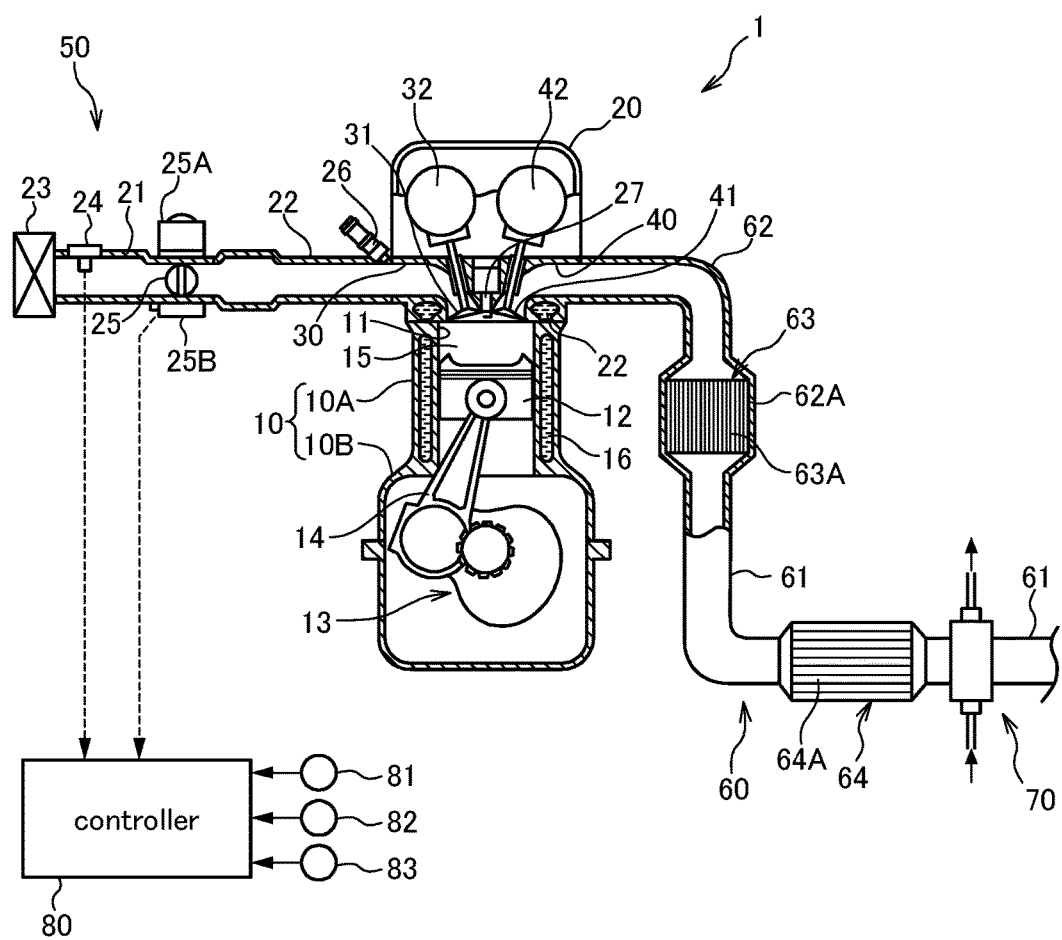
FIG. 1 is a view showing a schematic structure of an engine with an exhaust device according to the present embodiment.

FIG. 1 is a schematic structure diagram of an engine 1 with an exhaust device 60 according to a first embodiment.

The engine 1 shown in FIG. 1 is, for example, an inline four-cylinder internal combustion engine mounted in a vehicle. The engine 1 has a cylinder block 10, and a cylinder head 20 that is fixed above the cylinder block 10.

The cylinder block 10 is comprised of a cylinder part 10A, and a crankcase 10B that is formed below the cylinder part 10A.

Four cylinders 11 are formed in the cylinder part 10A. In each cylinder 11, a piston 12 is provided in a slidable fashion. The pistons 12 receive combustion pressure during the combustion of the air-fuel mixture, and move back and forth along the cylinders 11.

The crankcase 10B supports one crankshaft 13 in a rotatable fashion. A con rod 14 is coupled to each piston 12.

The lower ends of these con rods 14 are coupled to the crankshaft 13. The back-and-forth movement of the pistons 12 is converted into rotary motion via the con rods 14 and the crankshaft 13.

The cylinder head 20 is attached above the cylinder block 10. The lower plane of the cylinder head 20, the side plane of a cylinder 11, and the top plane of a piston 12 form a combustion chamber 15.

Also, in the cylinder head 20, intake ports 30 and exhaust ports 40 are formed in communication with the combustion chamber 15. For one combustion chamber 15, two intake ports 30 and two exhaust ports 40 are provided.

An intake valve 31 is provided in an intake port 30. The intake valve 31 is driven by an oscillating cam of a variable valve mechanism 32, and opens/closes the intake port 30 depending on the upward/downward movement of the piston 12. The variable valve mechanism 32 is arranged to be capable of changing the valve characteristics of the intake valve 31 such as the amount of lift, the operating angle and so on.

An exhaust valve 41 is provided in an exhaust port 40. The exhaust valve 41 is driven by an oscillating cam of a variable valve mechanism 42, and opens/closes the exhaust port 40 depending on the upward/downward movement of the piston 12. The variable valve mechanism 42 is arranged to be capable of changing the valve characteristics of the exhaust valve 41 such as the amount of lift, the operating angle and so on.

An ignition plug 27 is provided in the cylinder head 20 between the intake port 30 and the exhaust port 40. One ignition plug 27 is provided in every one combustion chamber 15 of the engine 1. The ignition plug 27 ignites the air-fuel mixture in the combustion chamber 15 in a predetermined timing.

In the cylinder part 10A and the cylinder head 20 of the cylinder block 10, water jackets 16 and 22 are provided. The water jackets 16 and 22 serve as paths where the cooling water (cooling fluid) for cooling off the surroundings of the cylinders 11 and the combustion chambers 15 circulates.

The engine 1 further has an intake device 50, which guides intake gas (fresh air) to the engine 1, and an exhaust device 60, which guides the exhaust gas from the engine 1 to the outside.

The intake device 50 has an intake tube 21, an intake manifold 22, an air cleaner 23, an air flow meter 24, an electronic control-type throttle valve 25 and a fuel injection valve 26.

The intake tube 21 is a path where the intake gas flows. The intake manifold 22 places the intake tube 21 and the intake port 30 in communication with each other. The intake manifold 22 distributes intake gas to each cylinder of the engine 1. These intake tube 21 and intake manifold 22 function as intake paths to guide intake gas to the engine 1.

An air cleaner 23 is provided at the upstream end of the intake tube 21. The air cleaner 23 removes alien substances such as dust, particles and so on from the intake gas taken in from the outside.

In the intake tube 21, downstream the air cleaner 23, an air flow meter 24 is provided. The air flow meter 24 detects the amount of intake gas flow in the intake tube 21, and outputs a detection signal to a controller 80.

In the intake tube 21, downstream the air flow meter 24, a throttle valve 25 is provided. The throttle valve 25 adjusts the amount of gas-intake to be introduced to each combustion chamber 15 by changing the cross-sectional area of the path of the intake tube 21 continuously or in steps. The throttle valve 25 is driven to open and close by a throttle actuator 25A. The degree of opening of the throttle valve 25 is detected by a throttle sensor 25B.

In the intake manifold 22, a fuel injection valve 26 is provided per cylinder of the engine 1. That is, fuel injection valves 26 are provided, one by one, in each branch tube of the intake manifold 22. The fuel injection valves 26 inject fuel in an amount suitable to the engine operating state, in the intake manifold 22, in a predetermined timing. The fuel that is supplied to the fuel injection valves 26 is stored in an unillustrated fuel tank.

The exhaust device 60 is a device to purify the exhaust gas from the engine 1, and guides this to the outside. The exhaust device 60 has an exhaust tube 61, an exhaust manifold 62, a manifold catalyst converter 63, an underfloor catalyst converter 64, and an exhaust heat collector 70.

The upstream end of the exhaust manifold 62 is connected to the cylinder head 20, and the downstream end of the exhaust manifold 62 is connected to the exhaust tube 61. The exhaust manifold 62 gathers the exhaust gas from each exhaust port 40, and leads this to the exhaust tube 61. These exhaust manifold 62 and the exhaust tube 61 function as exhaust paths to guide the exhaust gas from the engine 1 to the outside.

The manifold catalyst converter 63 is provided in a junction tube 62A of the exhaust manifold 62. The manifold catalyst converter 63 has an exhaust gas purifying part 63A, which purifies the exhaust gas.

The exhaust gas purifying part 63A is structured as a mesh support, that is, as a cylindrical member having a plurality of through-holes which the exhaust gas can pass through. The through-holes penetrate from one end plane of the exhaust gas purifying part 63A to the other end plane, along the axial direction. The exhaust gas purifying part 63A may be structured as a honeycomb structure, in which the shape of the cross-section of the through-holes is a hexagon. Note that the shape of the cross-section of the through-holes of the exhaust gas purifying part 63A is not limited to a quadrilateral, a hexagon and so on, and may assume other shapes such as a circle, a triangle and so on.

On the surface of the exhaust gas purifying part 63A, a three-way catalyst to purify the exhaust gas is carried. The exhaust gas purifying part 63A purifies the toxic substances included in the exhaust gas passing the through-holes, such as hydrocarbon, nitrogen oxide, carbon monoxide and so on, by using the three-way catalyst. The through-holes of the exhaust gas purifying part 63A also have a function of adjusting the flow of the exhaust gas in a certain direction (the direction in which the path extends). Thus, the manifold catalyst converter 63 is provided as a rectifier having the exhaust gas purifying part 63A (rectifying part) to rectify the exhaust gas flow.

The upstream end of the exhaust tube 61 is connected to the downstream end of the junction tube 62A of the exhaust manifold 62. The exhaust tube 61 is a path that guides the exhaust gas having passed the exhaust manifold 62 to the outside. In the exhaust tube 61, the underfloor catalyst converter 64 and the exhaust heat collector 70 are placed in order from the upstream.

The underfloor catalyst converter 64 has an exhaust gas purifying part 64A for purifying the exhaust gas.

Figure 2:
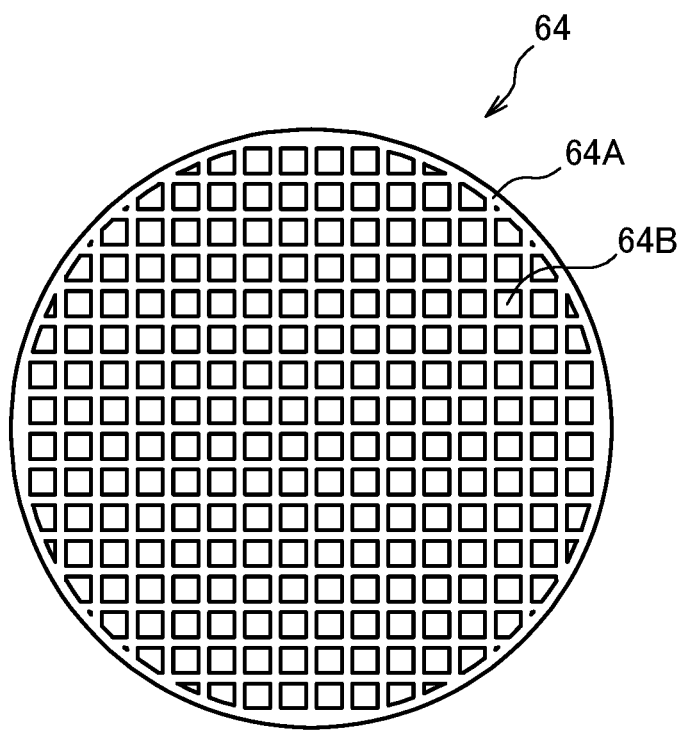
FIG. 2 is a front view of an exhaust gas purifying part of an underfloor catalyst converter provided in the exhaust device.

As shown in FIG. 2, the exhaust gas purifying part 64A is structured as a mesh support, that is, as a cylindrical member having a plurality of through-holes 64B which the exhaust gas can pass through. The through-holes 64B penetrate from one end plane of the exhaust gas purifying part 64A to the other end plane, along the axial direction. The exhaust gas purifying part 64A may be structured as a honeycomb structure, in which the shape of the cross-section of the through-holes 64B is a hexagon. Note that the shape of the cross-section of the through-holes 64B is not limited to a quadrilateral, a hexagon and so on, and may assume other shapes such as a circle, a triangle and so on.

On the surface of the exhaust gas purifying part 64A, a three-way catalyst to purify the exhaust gas is carried. The exhaust gas purifying part 64A purifies the toxic substances included in the exhaust gas passing the through-holes 64B, such as hydrocarbon, nitrogen oxide, carbon monoxide and so on, by using the three-way catalyst. The through-holes 64B of the exhaust gas purifying part 64A also have a function of adjusting the flow of the exhaust gas in a certain direction (the direction in which the path extends). Thus, the underfloor catalyst converter 64 is structured as a rectifier having the exhaust gas purifying part 64A (rectifying part) to rectify the exhaust gas flow.

As shown in FIG. 1, the exhaust heat collector 70 is provided in the downstream of the underfloor catalyst converter 64. The exhaust heat collector 70 is a device to collect heat from the exhaust gas having passed the exhaust gas purifying part 64A of the underfloor catalyst converter 64. The heat collected by the exhaust heat collector 70 is used to warm-up the engine 1, to provide heating, and so on.

The exhaust gas that is discharged from the engine 1 to the exhaust device 60 is purified in the manifold catalyst converter 63 and the underfloor catalyst converter 64, has its heat collected in the exhaust heat collector 70, and, after that, guided to the outside through the exhaust tube 61.

The above-described engine 1 is controlled by the controller 80. The controller 80 is comprised of a microcomputer, which has a central processing unit (CPU), a read-only memory (ROM), a random access memory (RAM) and an input-output interface (I/O interface).

Besides the detection signals from the air flow meter 24 and the throttle sensor 25B, detection signals from various sensors for detecting the engine operating state such as a temperature sensor 81, an engine revolution speed sensor 82, an accelerator pedal sensor 83 and so on are input in the controller 80. The temperature sensor 81 detects the temperature of the cooling water that flows in the water jacket 16. The engine revolution speed sensor 82 detects the engine revolution speed based on the crank angle. The accelerator pedal sensor 83 detects the accelerator pedal depression amount.

The controller 80 optimally controls the throttle position, the amount of fuel injection, the time of ignition and so on, on the basis of the detected operating state of the engine 1.

Figure 3:
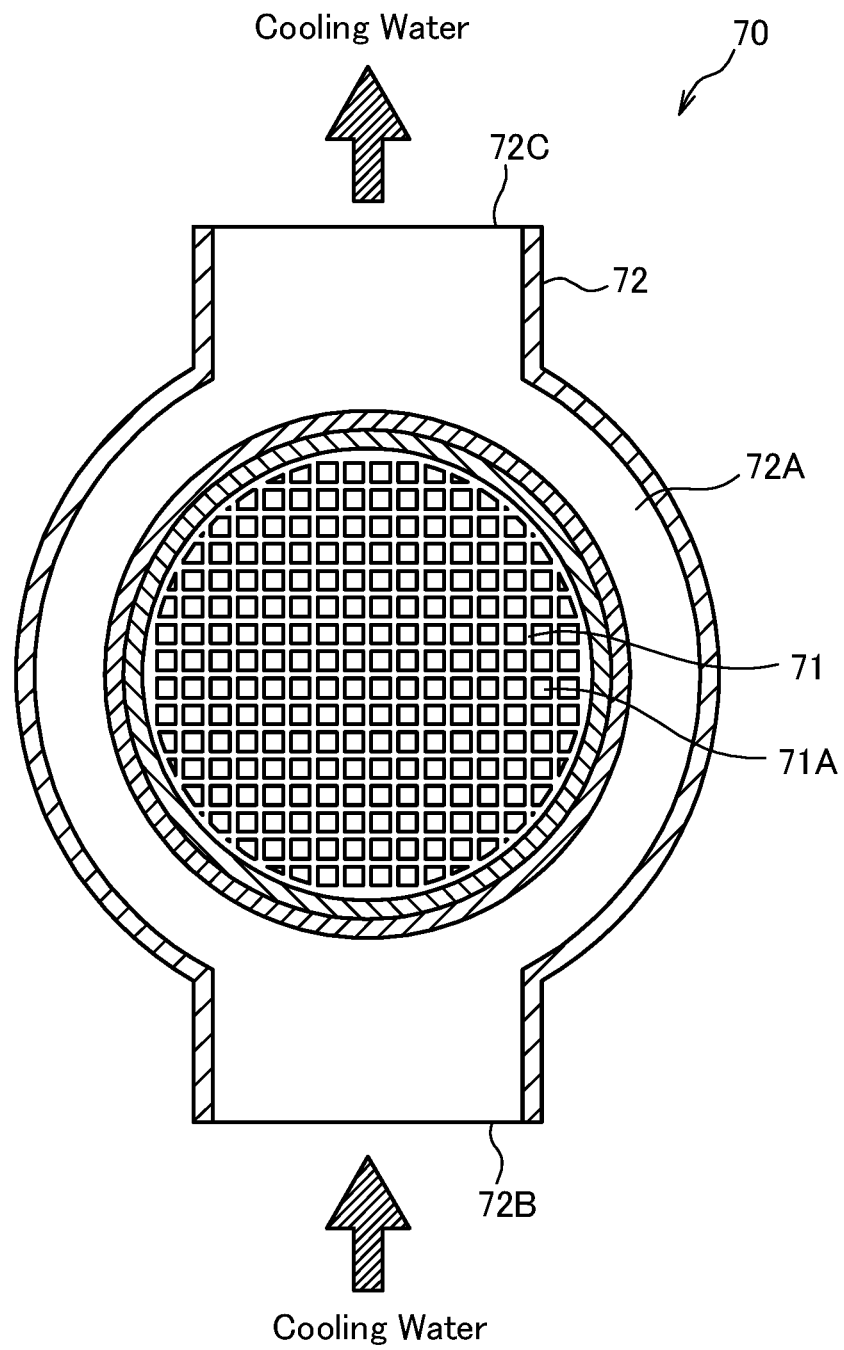
FIG. 3 is a cross-sectional view of an exhaust heat collector provided in the exhaust device.
Figure 4:
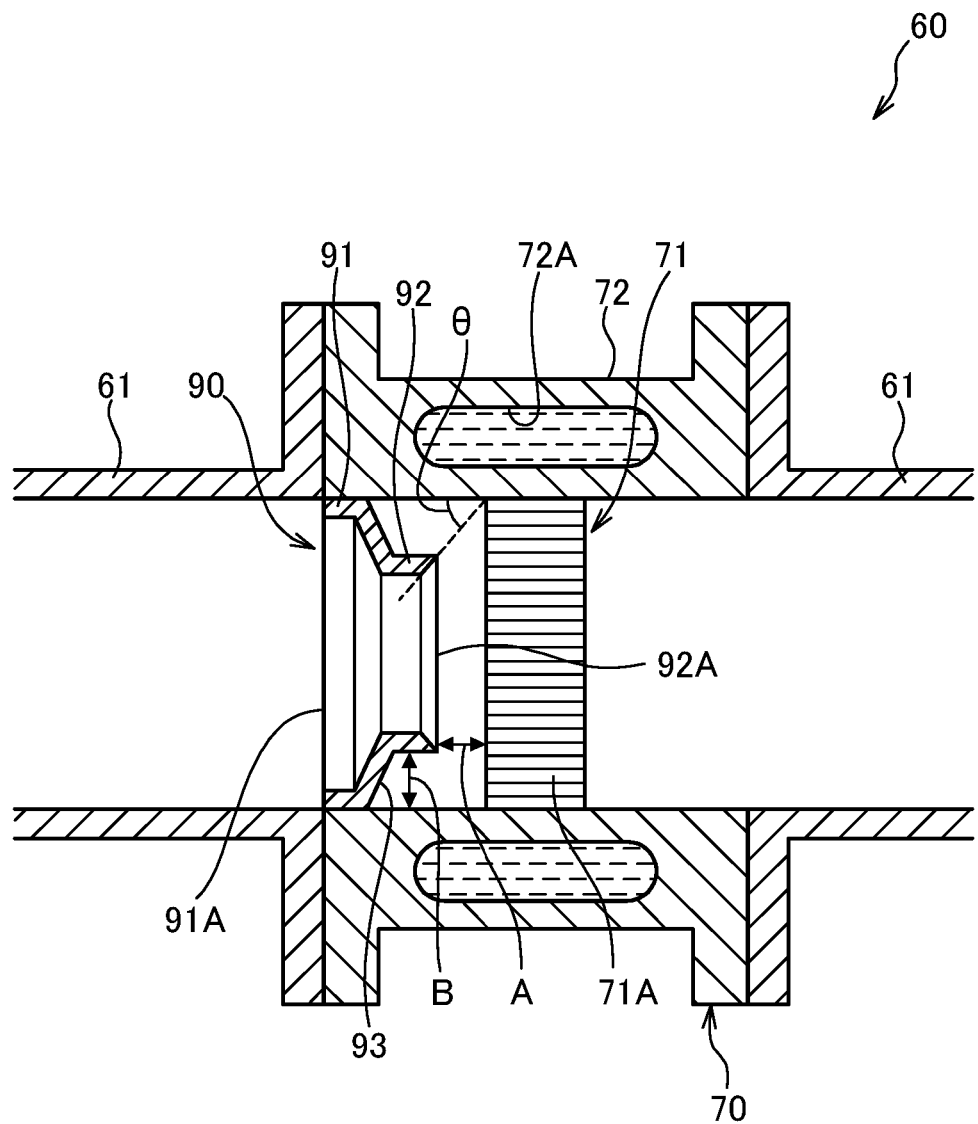
FIG. 4 is a cross-sectional view of the exhaust device including the exhaust heat collector.

Next, the structure of the exhaust heat collector 70 provided in the exhaust device 60 will be described with reference to FIG. 3 and FIG. 4. FIG. 3 is a cross-sectional view of the exhaust heat collector 70 along a direction at right angles to the direction the exhaust path extends. FIG. 4 is a cross-sectional view of the exhaust device 60 along the direction in which the exhaust path extends.

As shown in FIG. 3 and FIG. 4, the exhaust heat collector 70 has an exhaust heat collecting part 71, which collects heat from the exhaust gas, and a cooling part 72, which cools off the exhaust heat collecting part 71 using cooling water.

The cooling part 72 is a cylindrical member, and the cylindrical exhaust heat collecting part 71 is placed inside the cooling part 72. The inner diameter of the cooling part 72 is formed slightly bigger than the outer diameter of the exhaust heat collecting part 71, and the exhaust heat collecting part 71 is fitted in the cooling part 72. In the state the exhaust heat collecting part 71 is accommodated, the cooling part 72 is provided in the exhaust tube 61. The interior of the cooling part 72 is provided as part of the exhaust path where the exhaust gas flows.

The exhaust heat collecting part 71 is formed of a material having higher thermal conductivity than the materials of which the exhaust tube 61 and the exhaust manifold 62 are formed, such as silicon carbide (SiC). The exhaust heat collecting part 71 is a cylindrical mesh member with a plurality of through-holes 71A where the exhaust gas can pass through. The through-holes 71A penetrate from one end plane of the exhaust heat collecting part 71 to the other end plane along the axial direction. The exhaust heat collecting part 71 may be structured as a honeycomb structure, in which the shape of the cross section of the through-holes 71A is a hexagon. Note that the shape of the cross-section of the through-holes 71A is not limited to a quadrilateral, a hexagon and so on, and may assume other shapes such as a circle, a triangle and so on.

The exhaust heat collecting part 71 is heated by the exhaust gas that passes through the through-holes 71A. Consequently, the temperature of the exhaust gas having passed the exhaust heat collecting part 71 becomes lower than the temperature of the exhaust gas before passing the exhaust heat collecting part 71.

The cooling part 72 has an annular flow path 72A, which is formed along the outer periphery of the exhaust heat collecting part 71, an introducing port 72B, through which cooling water is introduced in the annular flow path 72A, and a drain port 72C, from which the cooling water in the annular flow path 72A is drained. The introducing port 72B and the drain port 72C are placed 180 degrees apart in the circumferential direction of the exhaust heat collecting part 71.

Cooling water, delivered by pressure by a water pump (not shown) of the engine 1, flows into the annular flow path 72A of the exhaust heat collector 70, through the introducing port 72B. The cooling water flows in the annular flow path 72A, and cools off the exhaust heat collecting part 71 from the outer peripheral side. The cooling water to pass the annular flow path 72A is warmed by the exhaust heat collecting part 71, and drained from the exhaust heat collector 70 through the drain port 72C. The drained cooling water is supplied to the cylinder block 10, the water jackets 16 and 22 of the cylinder head 20 and/or to a heating device, which is not illustrated, and is used to warm-up the engine 1, provide heating in the interior of cars, and so on.

The above-described exhaust heat collector 70 is provided in such a structure that heat is drawn away from the exhaust gas by means of the exhaust heat collecting part 71, and the exhaust heat collecting part 71 where the temperature has increased is cooled off with cooling water, thereby transmitting part of the exhaust heat to the cooling water. Consequently, when the engine 1 assumes high load and high engine revolution speed operating states and the amount of exhaust gas flow from the engine 1 increases, the amount of exhaust heat to be collected in the exhaust heat collector 70 also increases.

With exhaust devices of the conventional technology, when operating states at high load and high engine revolution speed continue for a while, the temperature of the cooling water passing the exhaust heat collector becomes too high, and this might result in an overheat condition.

So, the exhaust device 60 of the engine 1 according to the present embodiment has an exhaust gas flow controlling member 90, which controls the flow of exhaust gas in the upstream side of the exhaust heat collector 70, in order to prevent the temperature of cooling water from increasing too much even when operating states at high load and high engine revolution speed continue.

Now, the structure of the exhaust gas flow controlling member 90 provided in the exhaust device 60 will be described with reference to FIG. 4.

The exhaust gas flow controlling member 90 is a cylindrical member. The exhaust gas flow controlling member 90 is provided inside the cooling part 72, which constitutes part of the exhaust path. The exhaust gas flow controlling member 90 has an inlet part 91, where the exhaust gas having travelled through the exhaust tube 61 flows in, an outlet part 92, from which the exhaust gas is discharged, and a middle part 93, which connects between the inlet part 91 and the outlet part 92.

The inlet part 91 is a cylindrical body having an inlet port 91A, which is one open end of the exhaust gas flow controlling member 90. The inlet part 91 is fixed in the cooling part 72 so that its outer peripheral plane abuts the inner wall plane of the cooling part 72 of the exhaust heat collector 70.

The outlet part 92 is a cylindrical body having an outlet port 92A, which is the other open end of the exhaust gas flow controlling member 90. The opening diameter of the outlet port 92A of the outlet part 92 is arranged to be smaller than the opening diameter of the inlet port 91A of the inlet part 91. By this means, the inner wall plane of the cooling part 72, which constitutes part of the exhaust path, and the outer peripheral plane of the outlet part 92 are only a gap B apart.

The middle part 93 is a cylindrical body to connect between the inlet part 91 and the outlet part 92. The middle part 93 is a diameter-reducing part, provided so that the inner diameter of the middle part 93 becomes gradually smaller from the inlet part 91 toward the outlet part 92. The inlet part 91, the outlet part 92 and the middle part 93 are provided so that their individual central axes become co-centric.

The exhaust gas flow controlling member 90 and the exhaust heat collecting part 71 of the exhaust heat collector 70 are arranged co-axially. Also, the exhaust gas flow controlling member 90 is placed so that the outlet port 92A of the outlet part 92 and the upstream end plane of the exhaust heat collecting part 71 are a gap A apart. Thus, the exhaust gas flow controlling member 90 is placed a predetermined interval apart from the exhaust heat collecting part 71 of the exhaust heat collector 70 in the direction in which the exhaust path extends.

The interval between the exhaust gas flow controlling member 90 and the exhaust heat collecting part 71 is defined by the angle θ shown in FIG. 4. The angle θ is the angle that is formed, in the same plane along the direction in which the exhaust path extends, between the broken line linking between the outer edge of the outlet port 92A of the outlet part 92 and the outer edge of the upstream end plane of the exhaust heat collecting part 71, and the upstream inner wall plane of the cooling part 72. With the exhaust device 60 of the engine 1, it is desirable to keep the angle θ between 10° and 45°, from the perspective of the controllability of exhaust gas flow.

Also, the opening diameter of the outlet port 92A of the outlet part 92 in the exhaust gas flow controlling member 90 is arranged to be smaller than the outer diameter of the exhaust heat collecting part 71 of the exhaust heat collector 70. The outlet port 92A of the outlet part 92 opposes the central portion of the upstream end plane of the exhaust heat collecting part 71. From the perspective of the controllability of exhaust gas flow, it is preferable that the opening diameter of the outlet port 92A of the outlet part 92 assumes a value in a range of 80% to 90% of the outer diameter of the exhaust heat collecting part 71.

Next, the exhaust gas flow control by the exhaust gas flow controlling member 90 will be described with reference to FIG. 5A, FIG. 5B and FIG. 6.

Figure 5A:
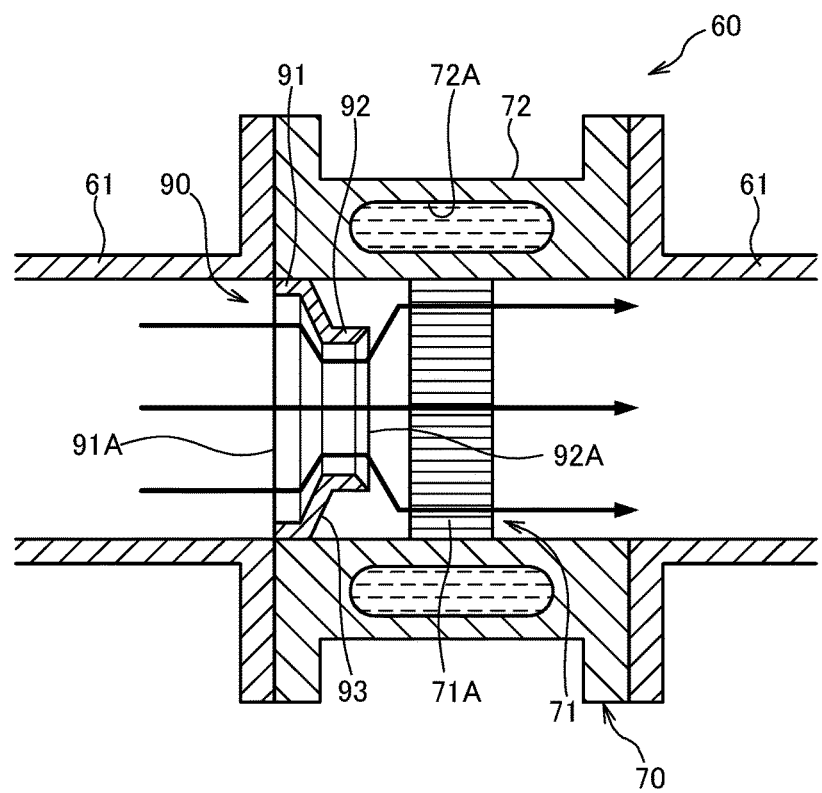
FIG. 5A is a view to explain the flow of exhaust gas in an engine operating state in which the amount of exhaust gas flow is small.

FIG. 5A is a view to explain the flow of exhaust gas in an engine operating state in which the amount of exhaust gas flow is small. FIG. 5B is a view to explain the flow of exhaust gas in an engine operating state in which the amount of exhaust gas flow is large. FIG. 6 is a view to show the relationship between the engine operating state and the efficiency of collection of exhaust heat by the exhaust heat collector 70.

As shown in FIG. 5A, exhaust gas from the engine 1 is guided through the exhaust tube 61 to the exhaust gas flow controlling member 90. The exhaust gas guided in this way is discharged from the outlet port 92A of the outlet part 92 to the upstream side of the exhaust heat collecting part 71, through the interior of the exhaust gas flow controlling member 90.

In an operating state in which the amount of exhaust gas flow from the engine 1 is small such as when the load is light and the engine revolution speed is low, as represented by the arrows of FIG. 5A, the exhaust gas passes in the exhaust gas flow controlling member 90 and is once gathered near the center of the path. Then, the exhaust gas is discharged from the outlet port 92A of the outlet part 92, then spreads out again in the cooling part 72, and is guided to the upstream side of the exhaust heat collecting part 71. In this way, in an operating state in which the amount of exhaust gas flow is small, the exhaust gas from the outlet part 92 of the exhaust gas flow controlling member 90 is supplied to the whole of the upstream end plane of the exhaust heat collecting part 71 relatively uniformly.

When the exhaust gas is supplied to the whole of the upstream end plane of the exhaust heat collecting part 71 uniformly, not only the central portion, but also the outer peripheral portion of the exhaust heat collecting part 71 is heated by the exhaust gas that passes the through-holes 71A. The cooling part 72 of the exhaust heat collector 70 is structured to draw heat away from the outer peripheral side of the exhaust heat collecting part 71, so that, as described earlier, when the temperature of the outer peripheral portion of the exhaust heat collecting part 71 increases, it then becomes possible to collect the heat of the exhaust heat collecting part 71 in an efficient manner, via the cooling water that flows in the cooling part 72.

Figure 6:
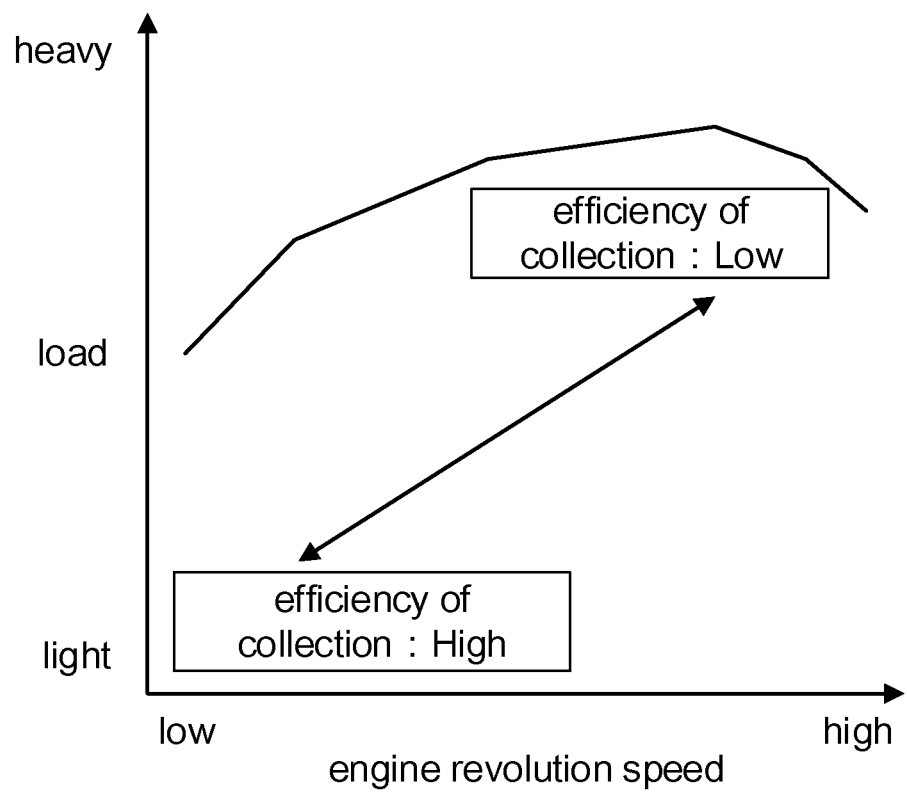
FIG. 6 is a view to show the relationship between the engine operating state and the efficiency of collection of exhaust heat by the exhaust heat collector.

Consequently, in an operating state in which the amount of exhaust gas flow from the engine 1 is small, for example, in the event of low load and low engine revolution speed operating states, the efficiency of collection of exhaust heat by the exhaust heat collector 70 improves, as shown in FIG. 6.

Figure 5B:
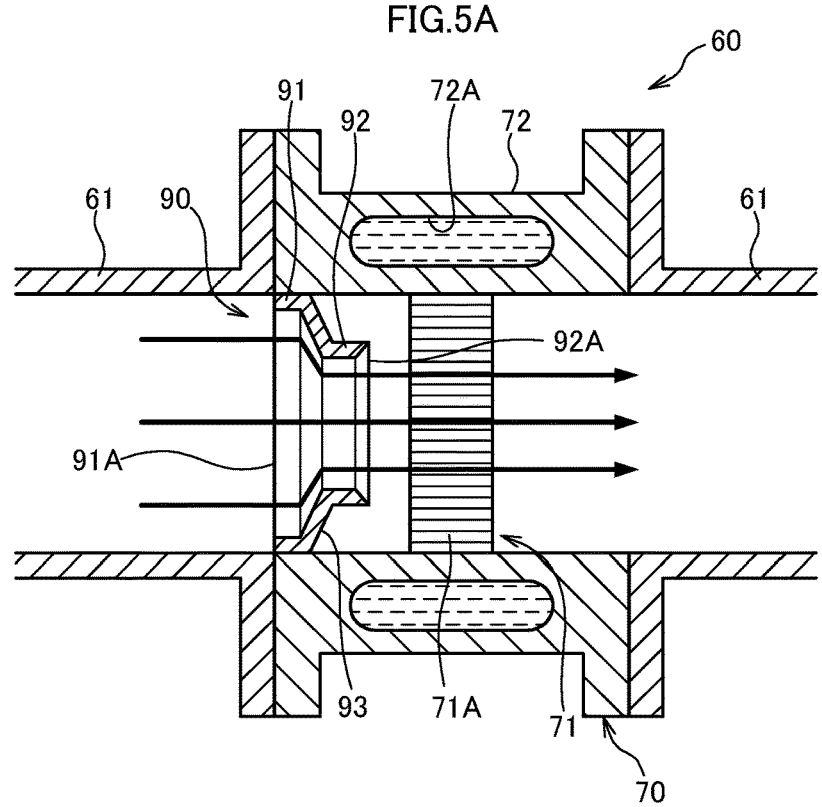
FIG. 5B is a view to explain the flow of exhaust gas in an engine operating state in which the amount of exhaust gas flow is large.

In an operating state in which the amount of exhaust gas flow from the engine 1 is large such as when the load is heavy and the engine revolution speed is high, as represented by the arrow of FIG. 5B, the exhaust gas passes in the exhaust gas flow controlling member 90 and is once gathered near the center of the path. Then, after the exhaust gas is discharged from the outlet port 92A of the outlet part 92, without spreading out in the cooling part 72, the exhaust gas is guided to the upstream side of the exhaust heat collecting part 71. In this way, in an operating state in which the amount of exhaust gas flow is large, the exhaust gas from the outlet part 92 is supplied to concentrate in the central portion of the upstream end plane of the exhaust heat collecting part 71.

When the exhaust gas is supplied to concentrate in the central portion of the upstream end plane of the exhaust heat collecting part 71, in the exhaust heat collecting part 71, the central portion alone is heated, in a localized fashion, by the exhaust gas passing the through-holes 71A. By means of this heating, the temperature of the outer peripheral portion of the exhaust heat collecting part 71 is prevented from rising. Since the cooling part 72 of the exhaust heat collector 70 is structured to draw heat away from the outer peripheral side of the exhaust heat collecting part 71, when the temperature of the outer peripheral portion of the exhaust heat collecting part 71 is prevented from rising, little heat transmits from the exhaust heat collecting part 71 to the cooling water that flows in the cooling part 72.

Consequently, in an operating state in which the amount of exhaust gas flow from the engine 1 is large, for example, in the event of high load and high engine revolution speed operating states, the efficiency of collection of exhaust heat in the exhaust heat collector 70 becomes low, as shown in FIG. 6.

The above-described exhaust device 60 of the engine 1 can provide the following advantages.

The exhaust device 60 of the engine 1 has the exhaust gas flow controlling member 90 in the upstream side of the exhaust heat collecting part 71. The opening diameter of the outlet part 92 of the exhaust gas flow controlling member 90 is arranged to be smaller than the outer diameter of the exhaust heat collecting part 71 of the exhaust heat collector 70. The exhaust gas flow controlling member 90 is provided so that the outlet port 92A of the outlet part 92 opposes the central portion of the exhaust heat collecting part 71, and, furthermore, the outlet port 92A of the outlet part 92 and the exhaust heat collecting part 71 are a predetermined gap apart in the direction in which the exhaust path extends.

In an engine operating state in which the amount of exhaust gas flow is small such as when the load is light and the engine revolution speed is low, the exhaust gas from the outlet part 92 of the exhaust gas flow controlling member 90 is supplied to the whole of the upstream end plane of the exhaust heat collecting part 71 relatively uniformly. Consequently, not only the central portion, but also the outer peripheral portion of the exhaust heat collecting part 71 is heated. Since the cooling part 72 of the exhaust heat collector 70 is provided to draw heat away from the outer peripheral side of the exhaust heat collecting part 71, in an operating state in which the amount of exhaust gas flow is small, the efficiency of collection of exhaust heat by the exhaust heat collector 70 can be improved. On the other hand, in an engine operating state in which the amount of exhaust gas flow is large such as when the load is heavy and the engine revolution speed is high, the exhaust gas from the outlet part 92 of the exhaust gas flow controlling member 90 is supplied to concentrate in the central portion of the upstream end plane of the exhaust heat collecting part 71. Consequently, the temperature of the outer peripheral portion of the exhaust heat collecting part 71 is prevented from rising. As a result of this, in an engine operating state in which the amount of exhaust gas flow is large, it is possible to lower the efficiency of collection of exhaust heat by the exhaust heat collector 70.

In this way, in operating states at high load and high engine revolution speed, it is possible to lower the efficiency of collection of exhaust heat by the exhaust heat collector 70. Consequently, even when high load and high engine revolution speed continue for a while, it is still possible to prevent the temperature of cooling water from increasing too much. By this means, it is possible to prevent an overheat condition from being produced in the engine 1.

The exhaust gas flow controlling member 90 is arranged so that the opening diameter of the outlet part 92 becomes smaller than that of the inlet part 91. The outer peripheral plane of the outlet part 92 and the inner wall plane of the cooling part 72, which constitutes part of the exhaust path, are a predetermined gap apart. By this means, it is possible to prevent extra heat from transmitting from the exhaust gas flow controlling member 90 to the exhaust heat collector 70.

Note that, in order to effectively lower the efficiency of collection of exhaust heat when the load is heavy and the engine revolution speed is high, it is preferable to design the gap between the exhaust gas flow controlling member 90 and the exhaust heat collecting part 71 so that the angle θ shown in FIG. 4 assumes a value within a range of 10° to 45°.

Also, in order to effectively lower the efficiency of collection of exhaust heat when the load is heavy and the engine revolution speed is high, the opening diameter of the outlet port 92A of the outlet part 92 in the exhaust gas flow controlling member 90 preferably has a value within a range of 80% to 90% of the outer diameter of the exhaust heat collecting part 71.

Second Embodiment

The exhaust device 60 of the engine 1 according to a second embodiment of the present invention will be described with reference to FIG. 7.

The exhaust device 60 according to the second embodiment is different from the exhaust device of the first embodiment in the way the exhaust gas flow controlling member 90 is placed. Note that, in the following description, components that perform the same functions as those of the first embodiment will be assigned the same codes, and overlapping description will be omitted wherever possible.

Figure 7:
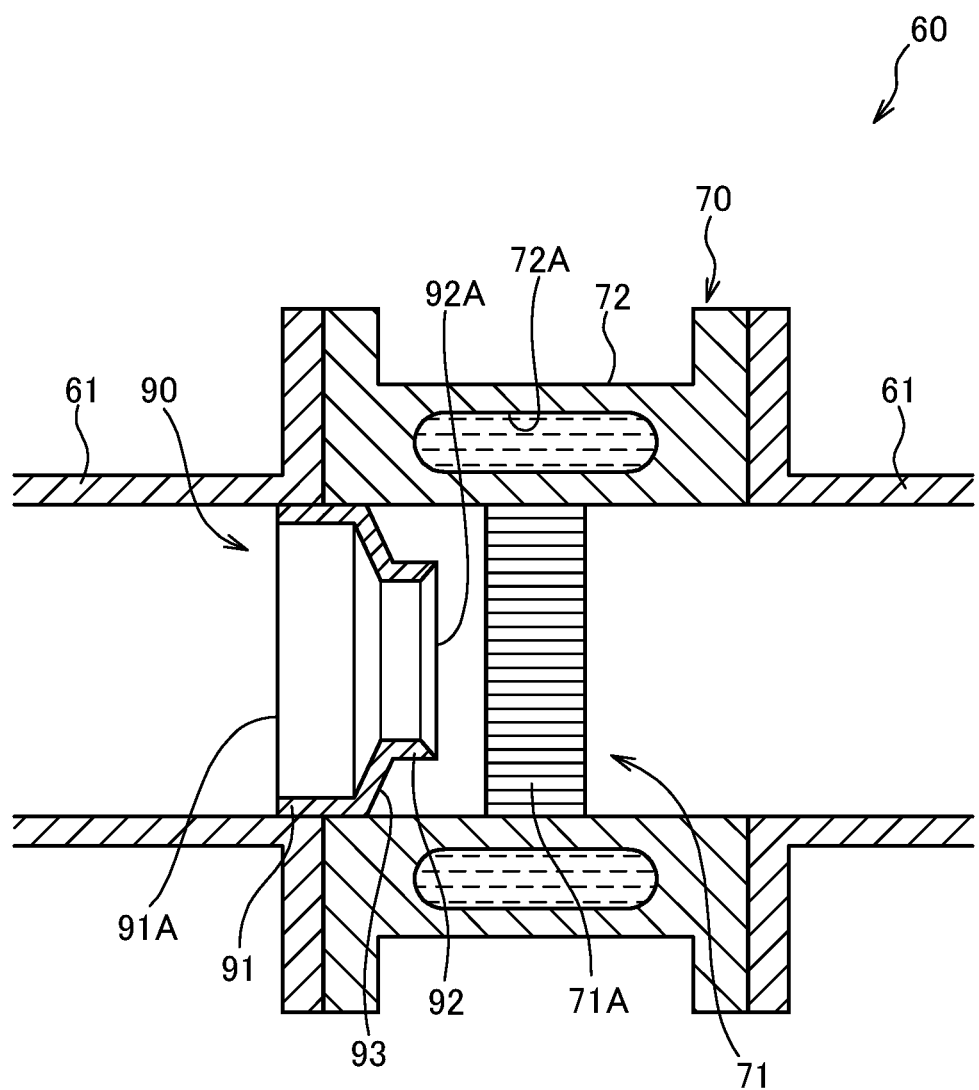
FIG. 7 is a cross-sectional view of an exhaust device of an engine according to a second embodiment.

As shown in FIG. 7, the exhaust gas flow controlling member 90 according to the second embodiment is fixed in the exhaust tube 61, which is connected to the upstream end of the exhaust heat collector 70. That is, the inlet part 91 is press-fitted in or welded to the inner peripheral plane of the exhaust tube 61, so that the exhaust gas flow controlling member 90 is fixed in the exhaust tube 61. At this time, the exhaust gas flow controlling member 90 is placed so that the downstream portion of the inlet part 91 projects into the cooling part 72 of the exhaust heat collector 70. Note that the inner diameter of the cooling part 72 of the exhaust heat collector 70 is arranged to be slightly bigger than the outer diameter of the inlet part 91 of the exhaust gas flow controlling member 90.

According to the above-described exhaust device 60 of the engine 1, the inlet part 91 of the exhaust gas flow controlling member 90 is fixed in the exhaust tube 61 so that part of this inlet part 91 projects into the exhaust heat collector 70. Because the inlet part 91 is fixed in the exhaust tube 61 in this way, it is possible to prevent unwanted heat from transmitting from the exhaust gas flow controlling member 90 to the exhaust heat collector 70.

Also, to connect between the exhaust tube 61 and the exhaust heat collector 70 when assembling the exhaust device 60, the inlet part 91, which projects from the exhaust tube 61, serves as a spigot joint, which makes it easy to determine the positions of, and connect between, the exhaust tube 61 and the exhaust heat collector 70.

Note that, although, according to the second embodiment, the exhaust gas flow controlling member 90 is fixed in the exhaust tube 61 so that the downstream portion of the inlet part 91 projects into the cooling part 72 of the exhaust heat collector 70, this is by no means limiting. The exhaust gas flow controlling member 90 may be fixed in the cooling part 72 of the exhaust heat collector 70 so that the upstream portion of the inlet part 91 projects into the exhaust tube 61. In this case, the downstream portion of the inlet part 91 is press-fitted in, or welded to, the inner wall plane of the cooling part 72, so that the exhaust gas flow controlling member 90 is fixed in the exhaust heat collector 70.

In this way, when the exhaust gas flow controlling member 90 is fixed in the exhaust heat collector 70, the concentricity between the exhaust gas flow controlling member 90 and the exhaust heat collecting part 71 of the exhaust heat collector 70 can be improved. Also, to connect between the exhaust tube 61 and the exhaust heat collector 70 when assembling the exhaust device 60, the inlet part 91, which projects from the exhaust heat collector 70, serves as a spigot joint, which makes it easy to determine the positions of, and connect between, the exhaust tube 61 and the exhaust heat collector 70.

Third Embodiment

Now, the exhaust device 60 of the engine 1 according to a third embodiment of the present invention will be described with reference to FIG. 8.

The exhaust device 60 according to the third embodiment is different from the exhaust devices of the first and second embodiments in the way of placing the exhaust gas flow controlling member 90.

Figure 8:
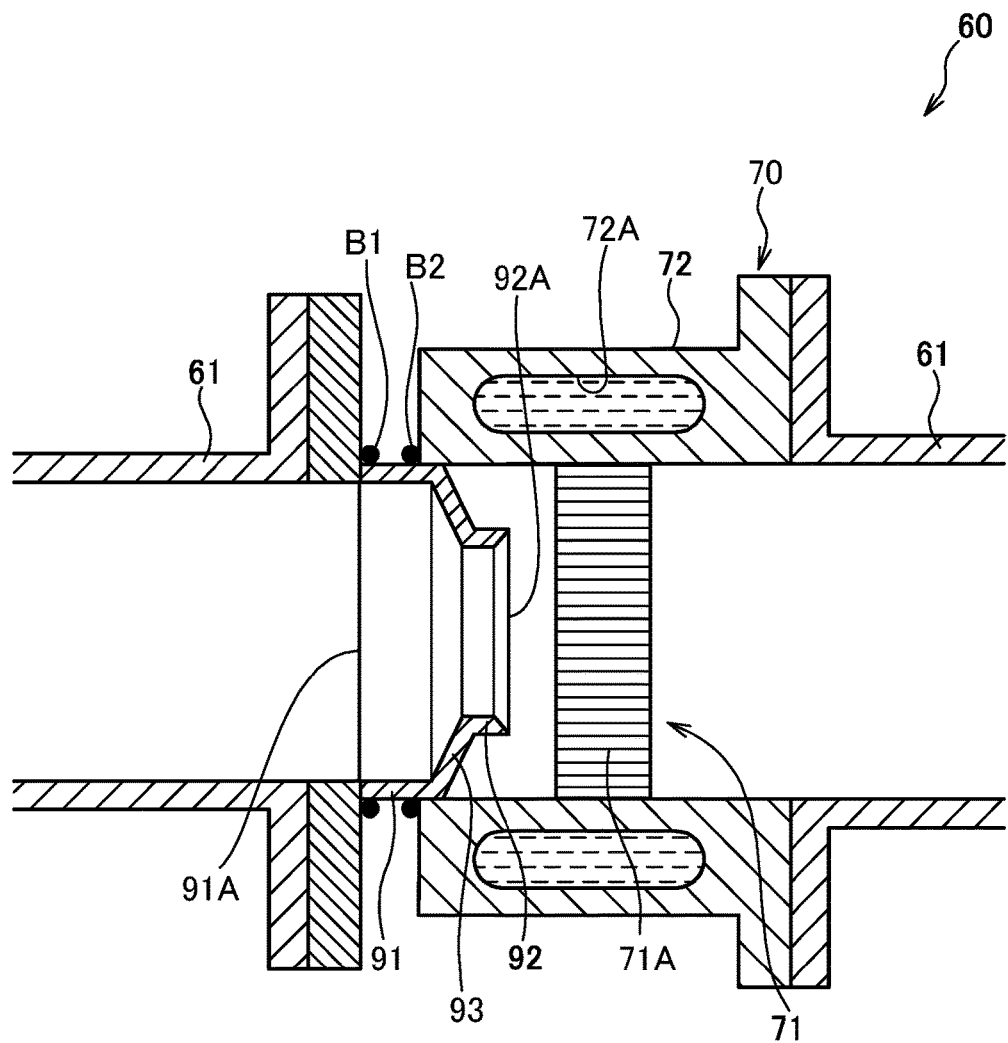
FIG. 8 is a cross-sectional view of an exhaust device of an engine according to a third embodiment.

As shown in FIG. 8, according to the third embodiment, the cooling part 72 of the exhaust heat collector 70 is structured in a split structure comprised of upstream members and downstream members. The exhaust gas flow controlling member 90 is provided so that the inlet part 91 is located between the upstream member and the downstream member of the cooling part 72. Consequently, the outer peripheral plane of the inlet part 91 of the exhaust gas flow controlling member 90 is exposed to the outside.

Note that the upstream end of the inlet part 91 of the exhaust gas flow controlling member 90 and the upstream member of the cooling part 72 of the exhaust heat collector 70 are coupled via a welding bead B1. Also, the downstream member of the cooling part 72 is fitted in the inlet part 91 externally, and the outer peripheral plane of the inlet part 91 and the downstream member of the cooling part 72 are coupled via a welding bead B2. By means of this welding, the exhaust gas to pass the exhaust gas flow controlling member 90 does not leak outside even when the exhaust gas flow controlling member 90 is placed so that the inlet part 91 is exposed to the outside.

Since the exhaust gas flow controlling member 90 according to the third embodiment is provided to expose the inlet part 91 to the outside, the inlet part 91 is cooled off with air. Consequently, even when high-temperature exhaust gas passes through the exhaust gas flow controlling member 90, it is still possible to prevent the temperature of the exhaust gas flow controlling member 90 from rising. Consequently, it is possible to prevent extra heat from transmitting from the exhaust gas flow controlling member 90 to the exhaust heat collector 70.

Also, the inlet part 91 of the exhaust gas flow controlling member 90 projects outward with respect to the axial direction, from the end part of the downstream member of the exhaust heat collector 70 so that the outer peripheral plane of the inlet part 91 is exposed to the outside. Consequently, it is possible to prevent the cooling water near the end parts of the cooling part 72, which boils more easily in a localized fashion, from taking in heat.

Note that it is equally possible to form an opening part in the exhaust tube 61 in the upstream side of the exhaust heat collector 70, and expose the inlet part 91 of the exhaust gas flow controlling member 90 to the outside via this opening part. Also, instead of placing the exhaust gas flow controlling member 90 so that the whole of the outer peripheral plane of the inlet part 91 is exposed to the outside, it is equally possible to place the exhaust gas flow controlling member 90 so that only part of the outer peripheral plane of the inlet part 91 is exposed to the outside.

Fourth Embodiment

Now, the exhaust device 60 of the engine 1 according to a fourth embodiment of the present invention will be described with reference to FIG. 9.

The exhaust device 60 according to the fourth embodiment is different from the exhaust devices of the first to third embodiments in the way the exhaust gas flow controlling member 90 is placed.

Figure 9:
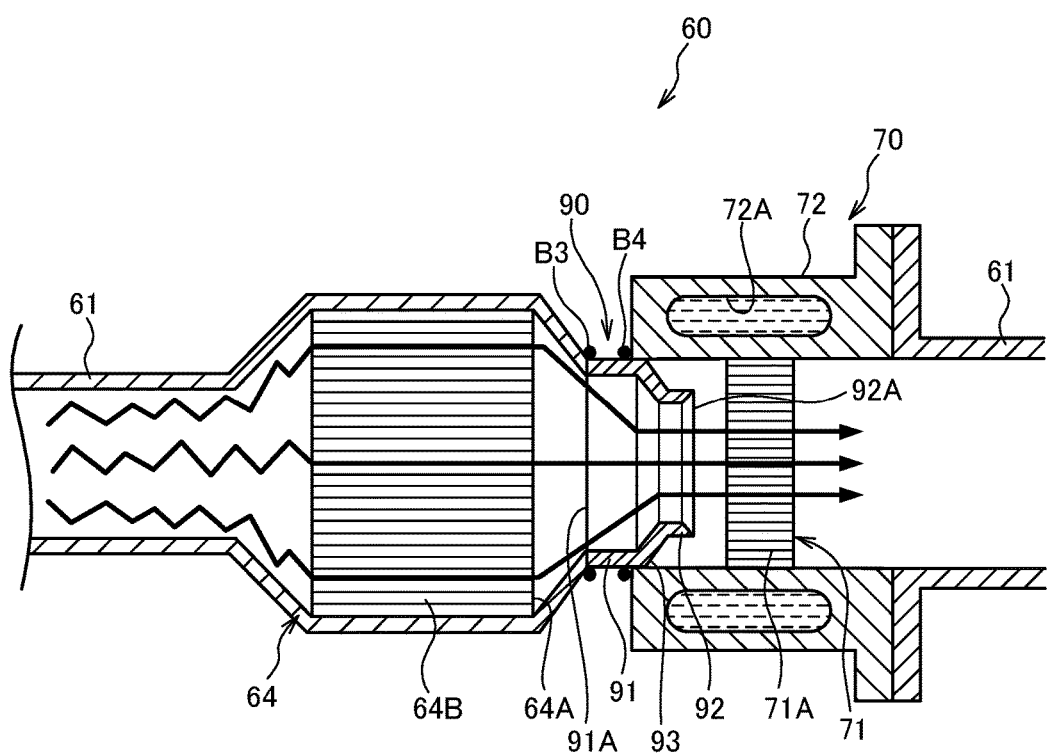
FIG. 9 is a cross-sectional view of an exhaust device of an engine according to a fourth embodiment.

As shown in FIG. 9, according to the fourth embodiment, the exhaust gas flow controlling member 90 is placed to neighbor the downstream side of the underfloor catalyst converter 64. Then, the exhaust heat collector 70 is placed to neighbor the downstream side of the exhaust gas flow controlling member 90.

As has been described with the first embodiment, the underfloor catalyst converter 64 is provided with an exhaust gas purifying part 64A, which has a plurality of through-holes 64B. The through-holes 64B of the exhaust gas purifying part 64A function to adjust the flow of exhaust gas to a certain direction (the direction in which the path extends). In this way, the underfloor catalyst converter 64 is structured as a rectifier having the exhaust gas purifying part 64A (rectifying part) that rectifies the exhaust gas.

The exhaust tube 61 between the exhaust gas purifying part 64A and the exhaust gas flow controlling member 90 is structured as a diameter-reducing path, where diameter becomes gradually smaller toward the downstream. The exhaust gas flow controlling member 90 is coupled to the downstream end of this diameter-reducing path. Also, the exhaust gas flow controlling member 90 is coupled to the exhaust heat collector 70 so that the outlet part 92 is inserted in the cooling part 72 of the exhaust heat collector 70.

The upstream end of the inlet part 91 of the exhaust gas flow controlling member 90 and the downstream end of the exhaust tube 61 (diameter-reducing path) are coupled via a welding bead B3. Also, the cooling part 72 is fitted in the inlet part 91 externally, and the outer peripheral plane of the inlet part 91 and the upstream end of the cooling part 72 are coupled via a welding bead B4.

Note that the opening diameter of the inlet port 91A of the inlet part 91 in the exhaust gas flow controlling member 90 is arranged to be smaller than the outer diameter of the exhaust gas purifying part 64A of the underfloor catalyst converter 64. Also, the exhaust gas flow controlling member 90 is provided so that the outer peripheral plane of the inlet part 91 is exposed to the outside. By means of this structure, the inlet part 91 is cooled with air.

According to the fourth embodiment, the exhaust gas purifying part 64A for adjusting the flow of exhaust gas is provided in the upstream of the exhaust gas flow controlling member 90, so that it is possible to supply rectified exhaust gas to the exhaust gas flow controlling member 90 and the exhaust heat collecting part 71. By rectifying the exhaust gas to introduce to the exhaust gas flow controlling member 90 in advance, the exhaust from the outlet part 92 more easily gathers in the central portion of the upstream end plane of the exhaust heat collecting part 71 in an engine operating state in which the amount of exhaust gas flow is large. As a result of this, the temperature of the outer peripheral portion of the exhaust heat collecting part 71 can be prevented even more from rising, so that it is possible to lower the efficiency of collection of exhaust heat in the exhaust heat collector 70 more reliably.

Also, since the exhaust gas purifying part 64A of the underfloor catalyst converter 64 is made to function as a rectifying part, it is not necessary to provide a rectifier separately, and the structure of the exhaust device 60 can be made simple. Note that it is also possible to place, in the exhaust device 60, a rectifying part having only an exhaust rectifying function, and not having an exhaust gas purifying function, in the upstream side of the exhaust gas flow controlling member 90.

Furthermore, by placing the exhaust gas flow controlling member 90 so that the inlet part 91 is exposed to the outside, the inlet part 91 is cooled with air. Consequently, even when high-temperature exhaust gas passes through the exhaust gas flow controlling member 90, it is still possible to prevent the temperature of the exhaust gas flow controlling member 90 from rising. Consequently, it is possible to prevent extra heat from transmitting from the exhaust gas flow controlling member 90 to the exhaust heat collector 70.

Also, the inlet part 91 of the exhaust gas flow controlling member 90 projects outward with respect to the axial direction, from the end part of the exhaust heat collector 70 so that the outer peripheral plane of the inlet part 91 is exposed to the outside. Consequently, it is possible to prevent the cooling water near the end parts of the cooling part 72, which boils more easily in a localized fashion, from taking in heat.

Fifth Embodiment

Figure 10A:
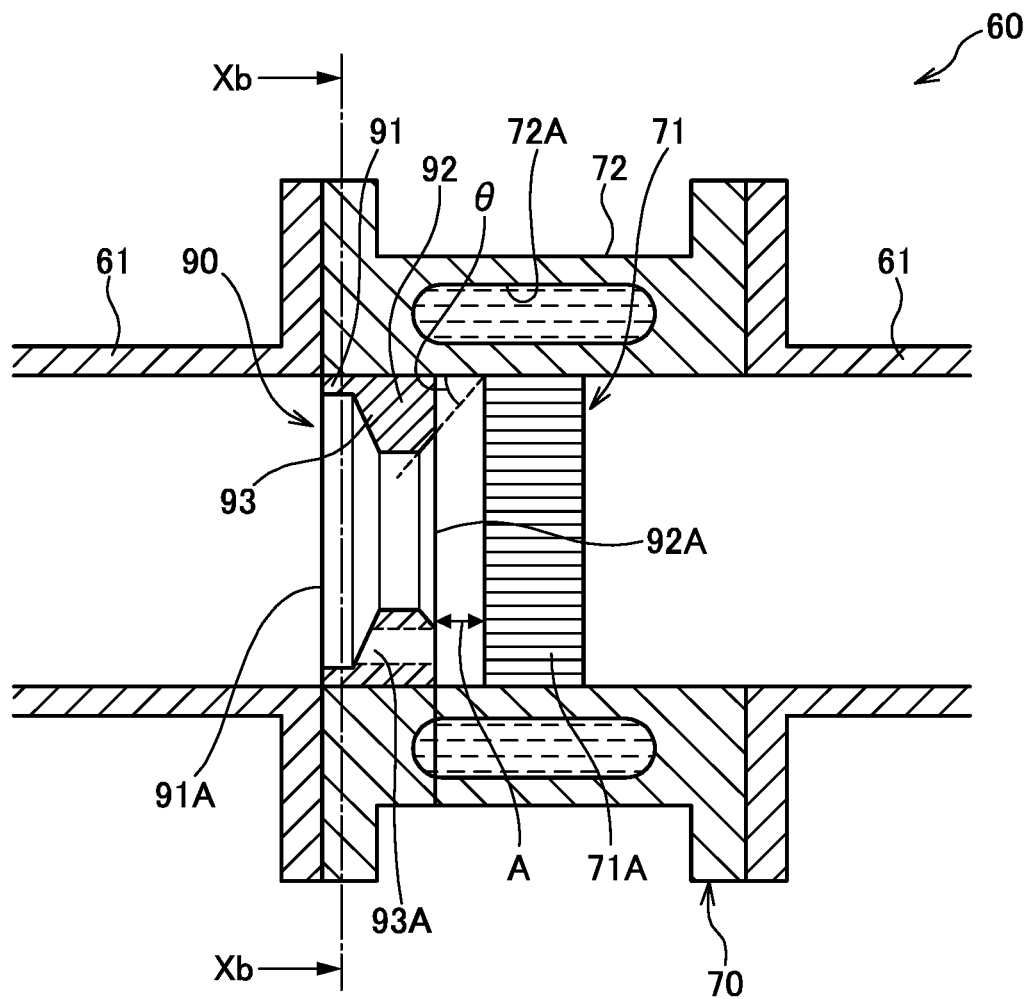
FIG. 10A is a cross-sectional view of an exhaust device of an engine according to a fifth embodiment.
Figure 10B:
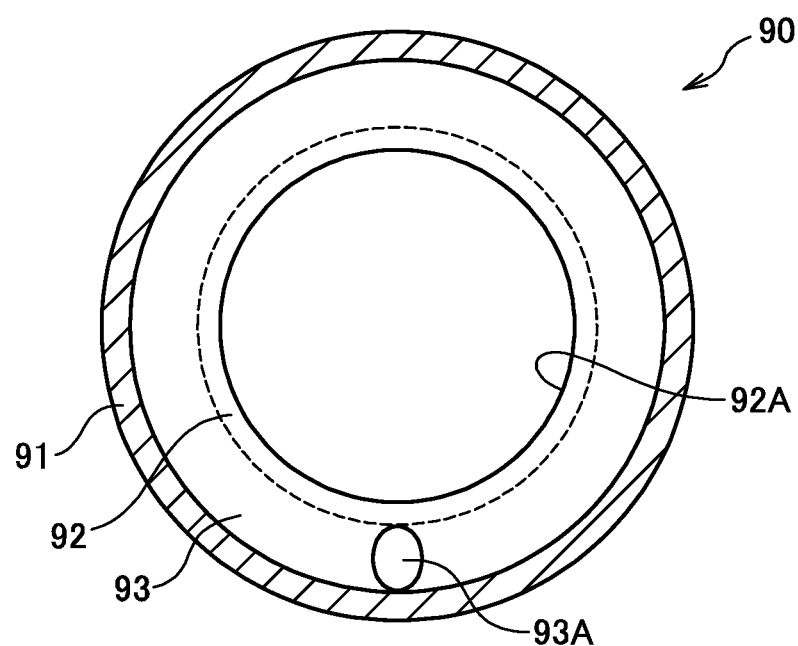
FIG. 10B is a longitudinal cross-sectional view of the exhaust gas flow controlling member along the Xb-Xb line of FIG. 10A.

The exhaust device 60 of the engine 1 according to the fifth embodiment of the present invention will be described with reference to FIG. 10A and FIG. 10B. FIG. 10A is a cross-sectional view of the exhaust device 60 of the engine according to the fifth embodiment. FIG. 10B is a longitudinal cross-sectional view of the exhaust gas flow controlling member 90 along the Xb-Xb line of FIG. 10A.

As shown in FIG. 10A, as in the first embodiment, the exhaust gas flow controlling member 90 of the fifth embodiment is placed so that the outlet port 92A of the outlet part 92 and the upstream end plane of the exhaust heat collecting part 71 are placed a gap A apart. Because the inner wall plane of the cooling part 72 is present in the outer peripheral side of the gap A, the exhaust gas that is present in the outer peripheral side of the gap A is more likely to lose heat in the cooling part 72. Consequently, part of the exhaust gas is cooled to the dew point and below, and, in the gap A, condensed water is produced along the inner wall plane of the cooling part 72. The condensed water that is produced drips under gravity, and pools in the lower part of the gap A. If the condensed water pools in the lower part of the gap A, this can be factor of the corrosion of the exhaust gas flow controlling member 90 and the exhaust path, so that it is preferable if the condensed water does not pool in the lower part of the gap A.

However, the exhaust gas from the downstream side of the exhaust gas flow controlling member 90 does not blow in the outer peripheral side of the gap A, the exhaust gas from the outlet port 92A of the outlet part 92 has difficulty finding its way to the outer peripheral side of the gap A. Therefore, little of the exhaust gas that stays in the outer peripheral side of the gap A is replaced by the exhaust gas from the outlet port 92A, and is more likely to lose its heat in the cooling part 72, and condense.

Thus, with the exhaust device 60 of the fifth embodiment, the exhaust gas flow controlling member 90 includes a through-hole 93A that can introduce exhaust gas to the outer peripheral side of the gap A, in addition to the outlet port 92A of the outlet part 92.

The structure of the exhaust gas flow controlling member 90 of the fifth embodiment is different from the exhaust devices of the first to fourth embodiments, and, as shown in FIG. 10A, a through-hole 93A is formed in the middle part 93 and the outlet part 92 of the exhaust gas flow controlling member 90. The through-hole 93A is a cylindrical shape comprised of round-hole opening and a path, and formed to penetrate between the upstream side and the downstream side of the exhaust gas flow controlling member 90. Also, when the exhaust gas flow controlling member 90 is provided in the exhaust device 60 as shown in FIG. 10B, the through-hole 93A is placed in a lower part of the exhaust gas flow controlling member 90 in the vertical direction, decentered from the central axis of the exhaust gas flow controlling member 90. To be more specific, the through-hole 93A is provided so that part of the opening region of the through-hole 93A is formed below the lowest part of the outlet port 92A of the outlet part 92 in the gravity direction. Note that the area of the opening of the through-hole 93A is smaller than the opening area of the outlet port 92A. Also, the size of the diameter of the through-hole 93A can be changed as appropriate within a range not to exceed the opening area of the outlet port 92A.

The outer diameter of the outlet part 92 of the exhaust gas flow controlling member 90 is formed to be the same as the diameter of the inlet part 91. Therefore, the outlet part 92 abuts the inner wall plane of the cooling part 72, which constitutes part of the exhaust path.

The exhaust device 60 of the fifth embodiment provides the following advantages.

The through-hole 93A of the exhaust gas flow controlling member 90 is provided to penetrate the exhaust gas flow controlling member 90 from the upstream to the downstream, so that part of the exhaust gas in the upstream side of the exhaust gas flow controlling member 90 is guided to the downstream side of the exhaust gas flow controlling member 90 via the through-hole 93A. Also, given that the through-hole 93A is formed in a position that is decentered from the central axis of the exhaust gas flow controlling member 90, the exhaust gas guided to the downstream side via the through-hole 93A is guided to the outer peripheral portion of the outlet part 92 in the gap A. Consequently, even when the exhaust gas stays in the outer peripheral portion of the gap A and produces condensed water, it is possible to blow away the condensed water with the exhaust gas from the through-hole 93A. Consequently, corrosion due to the pooling of condensed water can be prevented. Also, the opening area of the through-hole 93A is smaller than the opening area of the outlet port 92A of the outlet part 92, so that it is possible to lead the exhaust gas to the outer peripheral portion of the gap A, without making invalid the effect of allowing the exhaust gas to concentrate in the central portion of the upstream end plane of the exhaust heat collecting part 71.

Furthermore, since the through-hole 93A keeps introducing exhaust gas incessantly, little exhaust gas stays in the outer peripheral portion of the gap A. Consequently, the exhaust gas in the outer peripheral portion of the gap A is replaced by exhaust gas having passed the through-hole 93A before being cooled down to the dew point or below, so that it is possible to prevent cooling of exhaust gas and producing condensed water. Also, given that the through-hole 93A of the exhaust gas flow controlling member 90 is cylindrical, it is possible to prevent condensed water from pooling in the outer peripheral portion of the gap A, without requiring additional complex processes.

According to the exhaust device 60 of the fifth embodiment, the through-hole 93A of the exhaust gas flow controlling member 90 is formed below the central axis of the exhaust gas flow controlling member 90 in the vertical direction, so that it is possible to effectively blow away the condensed water that drips onto the lower part of the gap A under gravity.

According to the exhaust device 60 of the fifth embodiment, the through-hole 93A of the exhaust gas flow controlling member 90 is formed so that part of the opening region of the through-hole 93A is located below the lowest part of the outlet port 92A of the outlet part 92 in the vertical direction. Consequently, the lower part of the gap A, in particular, condensed water that drips under gravity and pools in the lowest part, can be directly sprayed with exhaust gas from the through-hole 93A. Consequently, primarily, the condensed water that pools in the lowest part of the gap A can be blown away, so that it is possible to prevent corrosion in the lowest part of the exhaust device 60.

Sixth Embodiment

Figure 11A:
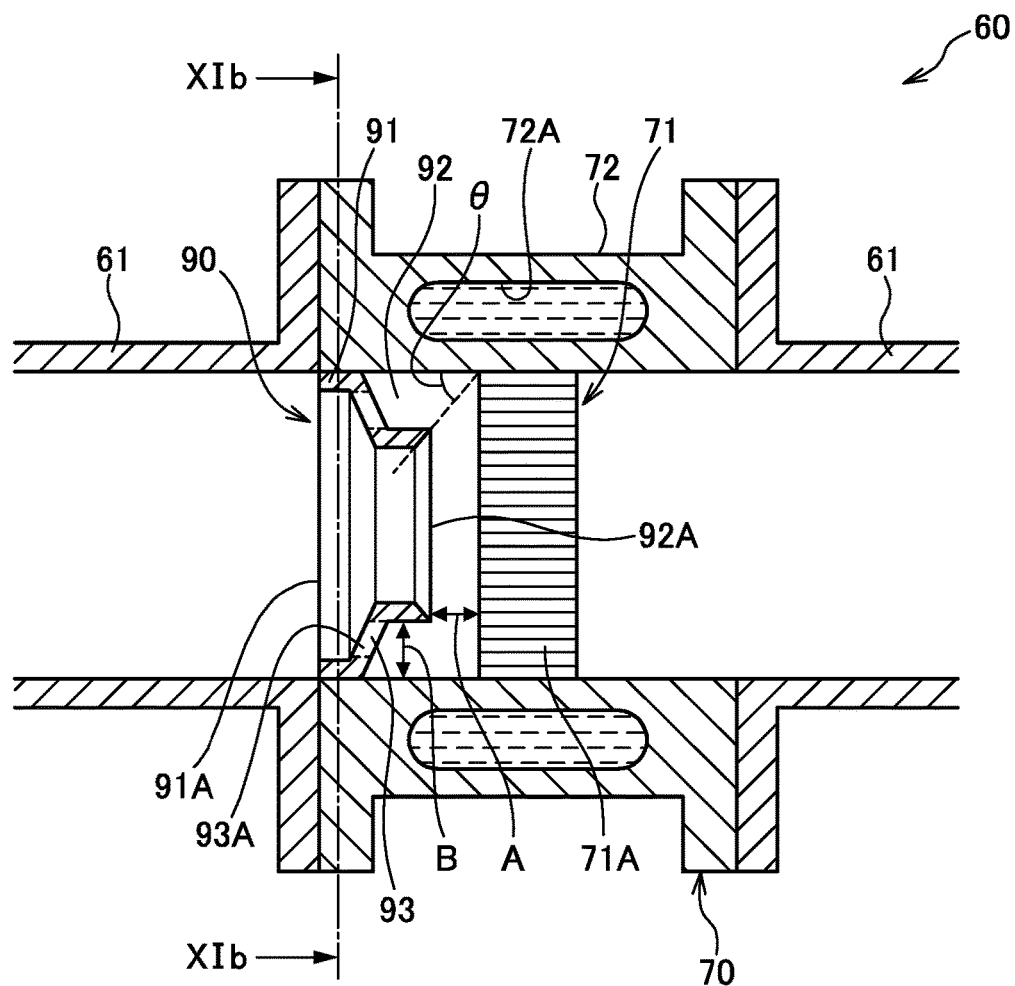
FIG. 11A is a cross-sectional view of an exhaust device of an engine according to a sixth embodiment.
Figure 11B:
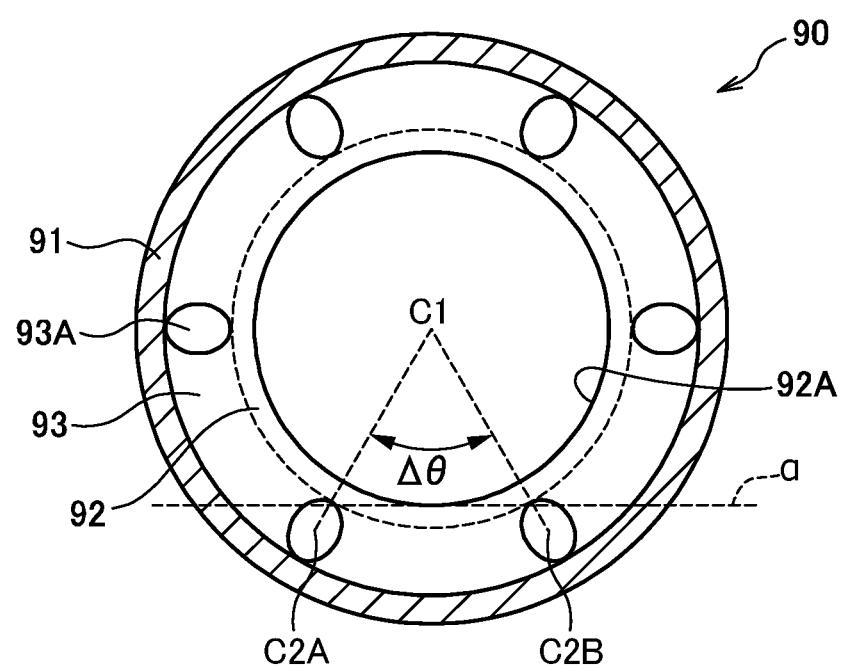
FIG. 11B is a longitudinal cross-sectional view of the exhaust gas flow controlling member along the XIb-XIb line of FIG. 11A.

The exhaust device 60 of the engine 1 according to a sixth embodiment of the present invention will be described with reference to FIG. 11A and FIG. 11B. FIG. 11A is a cross-sectional view of the exhaust device 60 of the engine 1 according to the sixth embodiment, and FIG. 11B is a longitudinal cross-sectional view of the exhaust gas flow controlling member 90 of FIG. 11A along the XIb-XIb line.

As shown in FIG. 11A, as in the first embodiment, the inner wall plane of the cooling part 72, which constitutes part of the exhaust path, and the outer peripheral plane of the outlet part 92 are a gap B apart in the exhaust gas flow controlling member 90 of the sixth embodiment. The inner wall plane of the cooling part 72 is present in the outer peripheral side of the gap A and the gap B, not only the exhaust gas that is present in the outer peripheral side of the gap A, but also the exhaust gas that is present in the outer peripheral side of the gap B, is more likely to lose heat in the cooling part 72. Therefore, the exhaust gas is cooled down to the dew point and below and is condensed, producing condensed water in the outer peripheral side of the gap A and the gap B.

Furthermore, the gap B is located in an outer peripheral portion further upstream of the outlet port 92A of the outlet part 92, so that very little of the exhaust gas having passed the outlet port 92A finds its way to the gap B. Therefore, in the outer peripheral side of the gap B, exhaust gas is more likely to condense than in the gap A, and condensed water is more likely to pool.

The exhaust device 60 according to the sixth embodiment is different from the fifth embodiment in the structure of the through-hole 93A of the middle part 93 of the exhaust gas flow controlling member 90. As shown in FIG. 11B, in the middle part 93, a plurality of through-holes 93A are provided along the circumferential direction of the exhaust gas flow controlling member 90. The through-holes 93A are formed to penetrate the middle part 93, as shown in FIG. 11A. Note that the total opening area, which adds up all the opening areas of a plurality of through-holes 93A, is smaller than the opening area of the outlet port 92A. Therefore, the opening area of one through-hole 93A is also smaller than the opening area of the outlet port 92A.

The through-holes 93A are placed so that, when the exhaust gas flow controlling member 90 is provided in the exhaust device 60, part of the opening region of at least one through-hole 93A is placed below the lowest part of the outlet port 92A of the outlet part 92 in the vertical direction. In order to place the through-holes 93A in this way, the angle $\Delta\theta$ formed by the broken lines connecting between the center point C1 of the outlet part 92 and the center points C2A and C2B of neighboring through-holes 93A, and the number of through-holes 93A can be set up by, for example, the following methods.

First, the angle $\Delta\theta$ to be formed between the broken lines is set. To be more specific, $\Delta\theta$ is set to be equal to or less than a predetermined angle so that part of each opening region of neighboring through-holes 93A is located below the broken line $\alpha$, which horizontally crosses the lowest part of the outlet port 92A.

Next, the number of through-holes 93A is set based on the angle $\Delta\theta$ set to be formed between the broken lines. To be more specific, the number of through-holes 93A is set to an integer that is greater than the result of dividing 360° by the angle $\Delta\theta$ to be formed between the broken lines. For example, when the angle $\Delta\theta$ to be formed between the broken lines is 50°, the number of through-hole 93A is set to be an integer bigger than the division result 7.2, that is, set to 8 or greater. Note that the effect of allowing exhaust gas to concentrate in the central portion of the upstream end plane of the exhaust heat collecting part 71 is hard to achieve when the number of through-holes 93A increases too much. Consequently, the number of through-holes 93A is preferably set to an integer rounding up from the result of division. For example, when the result of division is 7.2, the number of through-holes 93A is preferably set to 8. In this case, eight through-holes 93A are formed at equal intervals along the circumferential direction of the exhaust gas flow controlling member 90.

Note that $\Delta\theta$ may be set so that the whole of the neighboring through-holes 93A is located below the broken line $\alpha$, which crosses the lowest part of the outlet port 92A of the outlet part 92 horizontally. Also, $\Delta\theta$ may be set so that at least part of the opening regions of the neighboring through-holes 93A is located below the broken line $\alpha$.

According to exhaust device 60 of the sixth embodiment, the following advantages are provided.

With the exhaust device 60 of the sixth embodiment, the exhaust gas from a plurality of through-holes 93A provided along the circumferential direction of the exhaust gas flow controlling member 90 flows across the whole of the gap A and the gap B, so that the condensed water produced in the gap A and the gap B can be blown off more efficiently. Also, the exhaust gas from a plurality of through-holes 93A is introduced incessantly and replaces the exhaust gas in the gap A and the gap B, so that it is possible to prevent exhaust gas from cooling down and producing condensed water.

With the exhaust device 60 of the sixth embodiment, through-holes 93A are formed at equal intervals along the circumferential direction of the exhaust gas flow controlling member 90, so that, when the exhaust gas flow controlling member 90 is provided in the exhaust device 60, part of the opening region of at least one through-hole 93A is located below the lowest position of the outlet port 92A of the outlet part 92 in the vertical direction. Consequently, at least one of a plurality of through-holes 93A that are provided is placed below the lowest part in the open end of the outlet part 92 in the vertical direction, so that, even when condensed water is produced in the gap A and the gap B, the condensed water can be blown off. Furthermore, part of a plurality of through-holes 93A is always located below the lowest part in the open end of the outlet part 92 in the vertical direction, so that it is not necessary to adjust the position when providing the exhaust gas flow controlling member 90 in the interior of the cooling part 72, which constitutes part of the exhaust path, so that it is possible to reduce the number of steps upon assembling the exhaust device 60.

Also, although, with the exhaust device 60 of the engine 1 according to the fourth embodiment, the exhaust gas flow controlling member 90 and the exhaust heat collector 70 are placed in the downstream side of the underfloor catalyst converter 64 in a sequential manner, this is by no means limiting. The exhaust gas flow controlling member 90 and the exhaust heat collector 70 may be placed in the downstream side of the manifold catalyst converter 63 in a sequential manner.

Figure 12A:
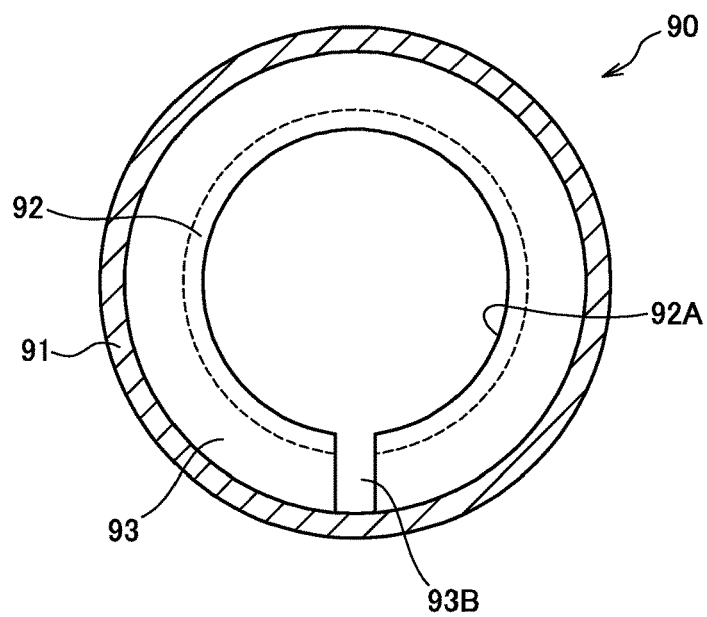
FIG. 12A shows a variation of a penetrating part provided in the exhaust gas flow controlling member of the fifth embodiment.
Figure 12B:
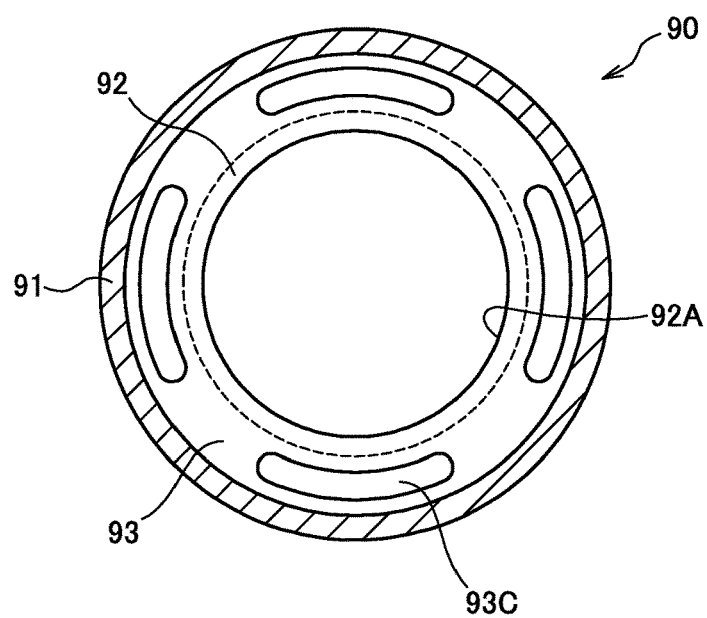
FIG. 12B is a variation of the penetrating part provided in the exhaust gas flow controlling member of the sixth embodiment.

Although, with the exhaust device 60 of the engine 1 according to the fifth embodiment and the sixth embodiment, the exhaust gas flow controlling member 90 has a through-hole 93A of a round hole, this is by no means limiting. The exhaust gas flow controlling member 90 may have a through-hole 93B of a square shape and a slit shape as shown in FIG. 12A. For example, a slit-shaped through-hole 93B may be cut by forming a rectangular notch in part of the middle part 93 and the lowest portion of the outlet part 92. Also, it is equally possible to form, for example, a belt-shaped penetrating part 93C, in the middle part 93, along the circumferential direction as shown in FIG. 12B, and let the exhaust gas flow over the outer peripheral plane of the gap A. In particular, as shown in FIG. 12A, when a slit to cover the outlet part 92 is processed in the middle part 93, the penetrating part can be processed easily, so that the efficiency of producing the exhaust gas flow controlling members 90 can be improved. Note that a slit to include the inlet part 91 may be processed in the middle part 93 as well.

Note that, although the through-hole 93A of the fifth embodiment is formed to penetrate through the middle part 93 and the outlet part 92, this is by no means limiting. The through-hole 93A may be provided to penetrate from the inlet part 91 to the outlet part 92. Also, the through-holes 93A of the sixth embodiment may be provided to penetrate between the inlet part 91 and the middle part 93, or from the inlet part 91 to the outlet part 92. Also, the through-holes 93A may be formed diagonally, may be formed in a shape other than a cylindrical shape, or may be formed so that the path draws a curved line. For example, by forming the through-holes 93A radially along the direction exhaust gas flows, toward the inner peripheral plane of the exhaust heat collector 70, it is possible to introduce the exhaust gas that passes the through-hole 93A nearer in the outer peripheral side of the gap A, and blow away the condensed water more efficiently.

Seventh Embodiment

Figure 13:
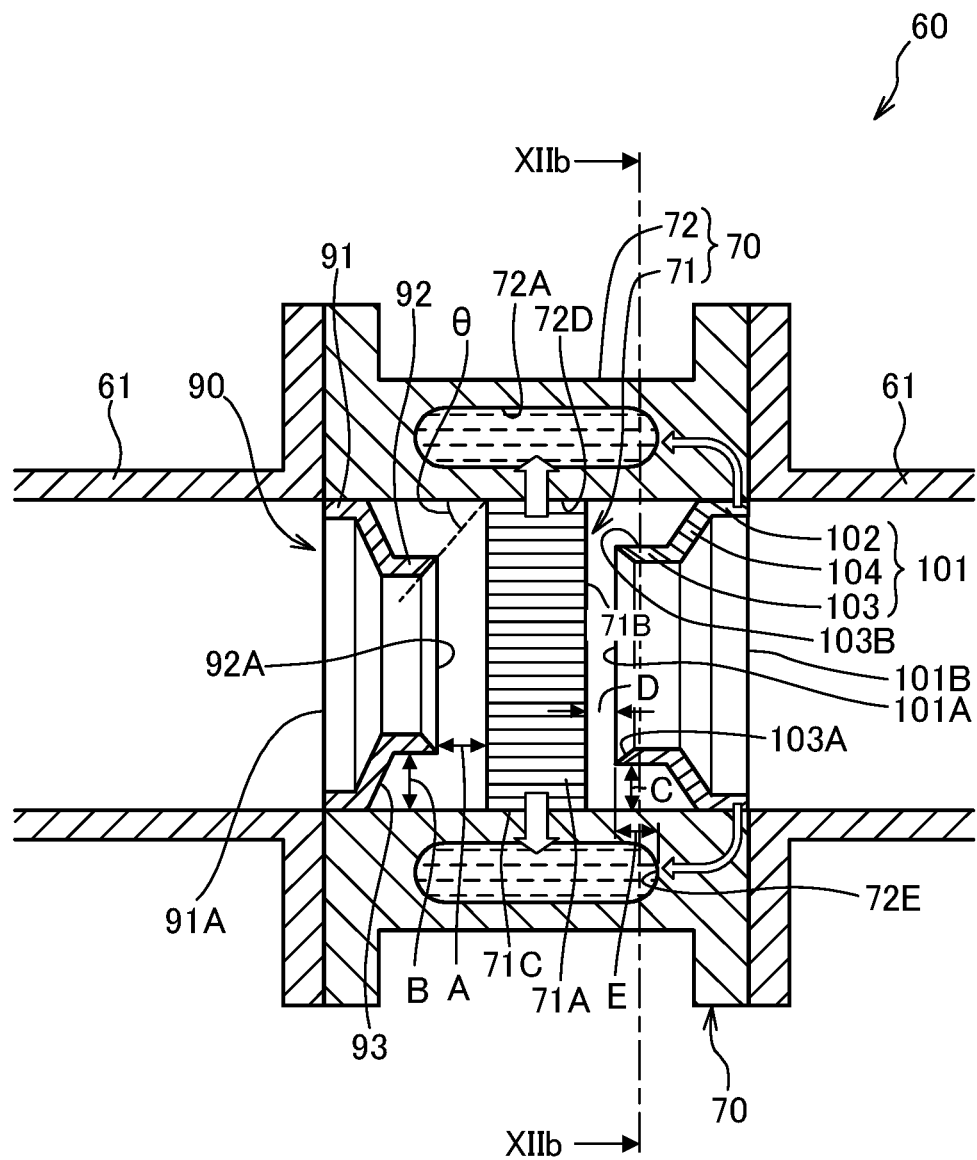
FIG. 13 is a cross-sectional view of an exhaust device of an engine according to a seventh embodiment.
Figure 14:
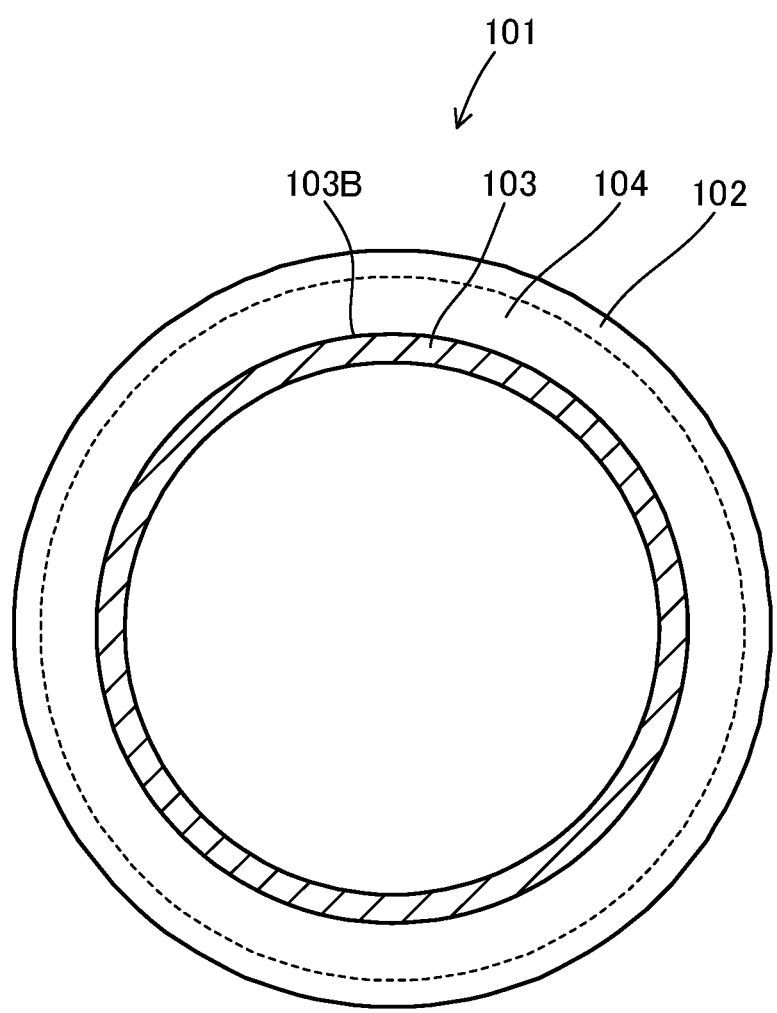
FIG. 14 is a longitudinal cross-sectional view of the exhaust gas flow controlling member along the XIIb-XIIb line of FIG. 13.

The exhaust device 60 of the engine 1 according to a seventh embodiment of the present invention will be described with reference to FIG. 13 and FIG. 14. FIG. 13 is a cross-sectional view of the exhaust device 60 of the engine 1 according to the seventh embodiment, and FIG. 14 is a longitudinal cross-sectional view of the exhaust gas flow controlling member 90 of FIG. 13 along the XIIb line.

The exhaust device 60 according to the seventh embodiment is not different from the exhaust device of the first embodiment in the way the exhaust gas flow controlling member 90 is placed, but is different in having a support member 101 immediately downstream of the exhaust heat collecting part 71.

Here, the reason to have the support member 101 will be described. The exhaust heat collecting part 71 is formed of a material having a relatively low thermal expansion coefficient (for example, ceramic), and the cooling part 72 is formed of a material having a relatively high thermal expansion coefficient (for example, a metal). Given that the thermal expansion coefficient is different between the exhaust heat collecting part 71 and the cooling part 72, if the temperature of both the cooling part 72 and exhaust heat collecting part 71 is raised, in the cooling part 72, the amount of outward expansion in the radial direction is greater than in the exhaust heat collecting part 71, and the inner diameter of the cooling part 72 becomes bigger than the outer diameter of the exhaust heat collecting part 71. As a result of this, the exhaust heat collecting part 71 can be inserted in the inner periphery of the cooling part 72. Afterward, when the cooling part 72 and the exhaust heat collecting part 71 both cool down, in the cooling part 72, the amount of inward contraction in the radial direction is greater than in the exhaust heat collecting part 71, and the inner diameter of the cooling part 72 becomes slightly smaller than the outer diameter of the exhaust heat collecting part 71, so that the cooling part 72 and the exhaust heat collecting part 71 are engaged with each other. In this way, the exhaust heat collecting part 71 is held in the inner periphery of the cooling part 72 by way of press-fitting. Consequently, even though the exhaust heat collecting part 71 and the cooling part 72 are not mechanically engaged, as far as the cooling part 72 is used in a predetermined temperature range while the engine is running, the engagement of the exhaust heat collecting part 71 and the cooling part 72 does not become loose.

However, when an unpredicted situation occurs while the engine 1 is running, for example, when the water pump (not shown) of the engine 1 fails and stops working, the cooling water no longer flows in the annular flow path 72A. Also, for example, when a hole opens up in a flexible hose (not shown) connected to the introducing port 72B, the cooling water no longer flows in the cooling part 72. If, in this way, the cooling water stays on in the annular flow path 72A, cases might occur where the cooling part 72 reaches a high temperature beyond the predetermined temperature range.

Then, the cooling part 72 thermally expands outward in the radial direction, and the inner diameter of the cooling part 72 becomes bigger than the outer diameter of the exhaust heat collecting part 71. As a result of this, the engagement between the exhaust heat collecting part 71 and the cooling part 72 becomes loose. While the engine is running, the exhaust heat collecting part 71 continues being under pressure from the exhaust gas, which is directed toward the downstream side. Consequently, when the engagement between the exhaust heat collecting part 71 and the cooling part 72 loosens, there is a threat that the exhaust heat collecting part 71 is pushed by the exhaust gas off a predetermined position and disengages from the cooling part 72, and the performance of collection of heat by the exhaust heat collector 70 lowers.

So, it is necessary to prevent the decrease of the performance of collection of heat by the exhaust heat collector 70 due to the disengagement of the exhaust heat collecting part 71 from the cooling part 72. Consequently, with the exhaust device 60 of the seventh embodiment, a support member 101 is provided immediately downstream of the exhaust heat collecting part 71.

The support member 101 is a cylindrical member. The support member 101 is provided in the interior of the cooling part 72, which constitutes part of the exhaust path. The support member 101 has a base part 102, a tip part 103, and a joint part 104.

The three parts, the base part 102, the tip part 103 and the joint part 104, are formed of the same material, and formed in one piece. Therefore, the base part 102, the tip part 103 and the joint part 104 have substantially the same thickness. The support member 101 can be a second source of heat, which will be described later, so that, the thicker the support member 101, the greater the amount of heat which the support member 101 receives. Consequently, the thickness of the support member 101 is determined so that the heat received in the support member 101 does not influence the performance of cooling by the exhaust heat collector 70, and the support member 101 can maintain enough strength not to crush when the exhaust heat collecting part 71 moves to the downstream.

The base part 102 and the tip part 103 to extend toward the upstream side are formed in a cylindrical shape. The outer diameter of the tip part 103 is smaller than the outer diameter of the base part 102. The upstream end 103A of the tip part 103 is formed in a tapered shape. Note that the upstream end 103A does not need to be formed in a tapered shape. For example, the upstream end 103A may be formed so that its end plane is at right angles to the direction the exhaust gas flows. The joint part 104 has a trumpet-like shape, in which the diameter becomes bigger gradually, and connects between the base part 102 and the tip part 103. By this means, the exhaust gas that drains from the exhaust heat collecting part 71 flows in from the inlet port 101A of the support member 101. Then, the exhaust gas that flows in is discharged to the downstream side from the outlet port 101B of the support member 101.

For example, by welding the base part 102 of the support member 101 to the downstream side of the cooling part 72, the cooling part 72 and the support member 101 are joined. The support member 101 is the same material as the cooling part 72 that is joined by welding. If the material of the cooling part 72 is a metal, it is desirable to use the same metal, as that of the cooling part 72, for the material of the support member 101. Note that the material of the cooling part 72 and the support member 101 is not limited to a metal, and may be a non-metallic material having properties that are the same as or equivalent to a metal.

Note that the welding point of the base part 102 is not limited to the downstream side of the cooling part 72. For example, it is possible to allow the base part 102 to project toward the interior of the exhaust tube 61 connected to the downstream end of the cooling part 72, and weld the base part 102, projecting inside the exhaust tube 61, to the exhaust tube 61.

By providing the support member 101 immediately downstream of the exhaust heat collecting part 71, even if the water pump fails, stops and so on while the engine 1 is running, it is still possible to prevent the exhaust heat collecting part 71 from disengaging from the cooling part 72, and prevent the decrease of the performance of collection of heat by the exhaust heat collection device 70.

Generally, when designing the exhaust heat collector 70, the exhaust heat collecting part 71 is considered to be the only heat source, and no heat source apart from the exhaust heat collecting part 71 is taken into account. However, by providing the support member 101 immediately downstream of the exhaust heat collecting part 71, the support member 101 receives the heat of exhaust gas, and the heat that is received transmits from the support member 101 to the cooling part 72, and may furthermore transmit to the cooling water in the annular flow path 72A (see the arrows on the right side in FIG. 13). In this cases, the exhaust heat collecting part 71 serves as a first source of heat, and the support member 101 serves as a second source of heat. However, as mentioned earlier, when the exhaust heat collector 70 is designed, collecting heat from the support member 101 as a second source of heat is not taken into account. Consequently, if the collection of heat from the second heat source is not taken into account, when the water pump fails, stops and so on, the amount of thermal expansion of the cooling part 72 increases due to the heat collected from the second source of heat. By this means, the time the engagement of the cooling part 72 and the exhaust heat collecting part 71 loosens, that is, the time the performance of collection of heat by the exhaust heat collector 70 decreases, comes earlier.

In this way, when the support member 101 is provided immediately downstream of the exhaust heat collecting part 71, it is necessary not to block the flow of exhaust gas, and prevent the collection of heat from the second heat source. Consequently, as shown in FIG. 13, a predetermined gap D, gap C and interval E are provided between the support member 101 and the exhaust heat collecting part 71, between the support member 101 an the cooling part 72, and so on. Now, the gap D, the gap E and the interval F will be described separately in detail.

First, the gap D, provided between the upstream end 103A of the tip part 103 and the downstream end 71B of the exhaust heat collecting part 71, will be described. In the following, the reason the gap D is provided will be described using a comparative example 1. Assume that, in the comparative example 1, the support member 101 is provided so that the upstream end 103A of the tip part 103 abuts the downstream end 71B of the exhaust heat collecting part 71. According to the comparative example 1, when the water pump fails, stops and so on while the engine is running, even if the exhaust heat collecting part 71 tries to move downstream with respect to the cooling part 72, the support member 101 abuts the downstream side of the exhaust heat collecting part 71, and this blocks the downstream movement of the exhaust heat collecting part 71. Consequently, the decrease of the performance of collection of heat by the exhaust heat collector 70 due to disengagement of the exhaust heat collecting part 71 from the cooling part 72 does not occur.

Here, unless the entrance and exit of many through-holes 71A provided in the exhaust heat collecting part 71 are closed, exhaust gas that enters the entrance of many through-holes 71A travels through the through-holes 71A and is discharged from the exit on an as-is basis. However, if the upstream end 103A of the tip part 103 abuts the downstream end 71B of the exhaust heat collecting part 71, the flow of exhaust gas is the same as when the exit of the through-holes 71A that are present in the outer peripheral side beyond this part is closed. Consequently, according to the comparative example 1, even when the water pump does not fail, stop and so on while the engine is running, the same state is assumed as when the outer peripheral portion of the exhaust heat collecting part 71 beyond the abutting part is closed, so that no exhaust gas flows in the outer peripheral portion beyond the abutting part. In other words, according to the comparative example 1, even during the normal state in which the water pump 65 does not fail, stop and so on while the engine is running, the area (effective area) of the region in the end plane of the exhaust heat collecting part 71 where exhaust gas flows smoothly decreases as much as the area of the outer periphery beyond the abutting part. Given that the exhaust heat collecting part 71 can collect heat efficiently when exhaust gas flows smoothly from the upstream side to the downstream side in all the through-holes 71A in the exhaust heat collecting part 71, if the effective area become smaller, the performance of collection of heat by the exhaust heat collector 70 decreases.

Also, according to the comparative example 1, cases might occur where the exhaust heat collecting part 71 of a ceramic material and the tip part 103 of a metallic material, while abutting each other, experience vibration from the engine, the vehicle body and so on. In such instances, the downstream end 71B of the exhaust heat collecting part 71, which is ceramic, is ground off by the upstream end 103A of the tip part 103, which is a metal. The piece of the exhaust heat collecting part 71 that is scraped off is discharged to the downstream side of the exhaust path as contamination. In this way, according to the comparative example 1, even during the normal state, the effective area in the exhaust heat collecting part 71 where exhaust gas flows smoothly becomes smaller, and vibration produces contamination.

On the other hand, according to the seventh embodiment, the gap D is provided between the upstream end 103A of the tip part 103 and the downstream end 71B of the exhaust heat collecting part 71. By providing the gap D, it is possible to prevent the decrease of the performance of collection of heat by the exhaust heat collector 70, due to the decrease of the effective area in the exhaust heat collecting part 71 where exhaust gas flows smoothly, which is produced in the comparative example 1 even during the normal state, and, furthermore, prevent contamination from being produced from vibration.

Also, with the seventh embodiment, the outer diameter of the upstream end 103A of the tip part 103 is smaller than the outer diameter of the exhaust heat collecting part 71, and a gap C is provided between the outer periphery 103B of the tip part 103 and the inner periphery 72D of the cooling part 72, which opposes the outer periphery 103B of the tip part 103. The reason the gap C is provided will be described below with reference to a comparative example 2. Assume that, in the comparative example 2, the support member 101 is structured so that the inner diameter is the same as in the seventh embodiment, and the outer periphery 103B of the tip part 103 abuts the inner periphery 72D of the cooling part 72.

In the comparative example 2, the cross-sectional area of the support member 101 along the direction of exhaust gas flow is larger than in the seventh embodiment, so that the support member 101, which serves as a second source of heat, receives a large amount of heat. Furthermore, sine the outer periphery 103B of the support member 101 abuts the inner periphery 72D of the cooling part 72, the route through which heat transmits from the support member 101 to the cooling water in the annular flow path 72A is shorter than in the seventh embodiment. For these reasons, when the water pump fails, stops and so on, the amount of thermal expansion in the cooling part 72 increases as much as the heat collected from the second source of heat, and the time the engagement of the cooling part 72 and the exhaust heat collecting part 71 loosens comes earlier than in the seventh embodiment.

On the other hand, according to the seventh embodiment, the gap C is provided between the tip part 103 and the cooling part 72 opposing the tip part 103. By this means, the thickness of the tip part 103 becomes thinner than in the comparative example 2, and the amount of heat which the support member 101 serving as a second source of heat receives decreases. Also, the heat which the support member 101 receives reaches the downstream of the cooling part 72 through the base part 102. In other words, heat does not transmit from the tip part 103 to the cooling part 72 directly. In this way, heat transmits from the base part 102 only to the downstream side of the cooling part 72, so that the route where heat transmits from the support member 101 to the cooling water in the annular flow path 72A is longer than in the comparative example 2 (see the arrows on the right side in FIG. 13). For these reasons, when the water pump fails, stops and so on while the engine is running, the inflow of heat from the support member 101, which serves as a second source of heat, to the cooling water in the annular flow path 72A, is reduced compared to the comparative example 2.

Next, assume that the upstream end 103A of the tip part 103 is present in the upstream side of the downstream end 72E of the annular flow path 72A in the direction of exhaust gas flow (the right side in FIG. 13). Here, in the annular flow path 72A, the end part on the side where the support member 101 is provided will be referred to as the downstream end 72E in the direction of exhaust gas flow. The end part on the side where the exhaust gas flow controlling member 90 is provided will be referred to as the upstream end in the direction of exhaust gas flow. Note that FIG. 13 shows a cross-section at right angles to the direction in which the introducing port 72B and the drain port 72C of the cooling part 72 are open. Also, the cross-section of the annular flow path 72A in the direction in which the exhaust path extends is semicircular in both the downstream side (the right side in FIG. 13) and the upstream side (the left side in FIG. 13) along the direction of exhaust gas flow, but is by no means limited to a shape like this.

Here, the interval E is provided between the upstream end 103A of the tip part 103 and the downstream end 72E of the annular flow path 72A along the direction of exhaust gas flow. Here, the reason the interval E is provided will be described using a comparative example 3. Assume that, with the comparative example 3, the upstream end 103A of the tip part 103 is present further downstream of the downstream end 72E of the annular flow path 72A along the direction of exhaust gas flow. Also, assume that, when the water pump fails, stops and so on while the engine is running, accompanying this, the downstream end 71B of the exhaust heat collecting part 71 moves beyond the location to meet the downstream end 72E of the annular flow path 72A in the direction of exhaust gas flow, and the exhaust heat collecting part 71 is located near the support member 101.

In this way, even when the downstream end 71B of the exhaust heat collecting part 71 crosses the location to meet the downstream end 72E of the annular flow path 72A in the direction of exhaust gas flow, heat that is received in the exhaust heat collecting part 71 transmits, in a radial fashion, from the outer periphery 71C of the exhaust heat collecting part 71 to the interior of the cooling part 72. Consequently, part of the heat received in the exhaust heat collecting part 71 transmits to the cooling water in the annular flow path 72A. However, some of the heat received in the exhaust heat collecting part 71 does not transmit to the cooling water in the annular flow path 72A, and some transmits to parts apart from the annular flow path 72A. The heat that is received in the exhaust heat collecting part 71 and transmits to parts other than the annular flow path 72A is not transmitted to the cooling water in the annular flow path 72A.

Meanwhile, according to the seventh embodiment, the upstream end 103A of the tip part 103 is present upstream of the downstream end 72E of the annular flow path 72A along the direction of exhaust gas flow. By this means, the cooling water in the annular flow path 72A can receive the heat that is received in the exhaust heat collecting part 71, without missing any.

Although the seventh embodiment is structured so that the upstream end 103A of the tip part 103 is present upstream of the downstream end 72E of the annular flow path 72A along the direction of exhaust gas flow, this structure is by no means limiting. A structure may be used here in which, in the direction of exhaust gas flow, the downstream end 71B of the exhaust heat collecting part 71 meets the downstream end 72E of the annular flow path 72A along the direction of exhaust gas flow. By means of such structure, even when the water pump fails, stops and so on while the engine is running, and, accompanying this, the exhaust heat collecting part 71 moves to the downstream side, the exhaust heat collecting part 71 stays in a location to neighbor the annular flow path 72A. By allowing the exhaust heat collecting part 71 to stay in a location to neighbor the annular flow path 72A, the heat which the exhaust heat collecting part 71 receives transmits to the cooling water in the annular flow path 72A more than in the comparative example 3. Note that the interval C, the interval D and the distance E are determined by an adaptation.

Eighth Embodiment

Figure 15:
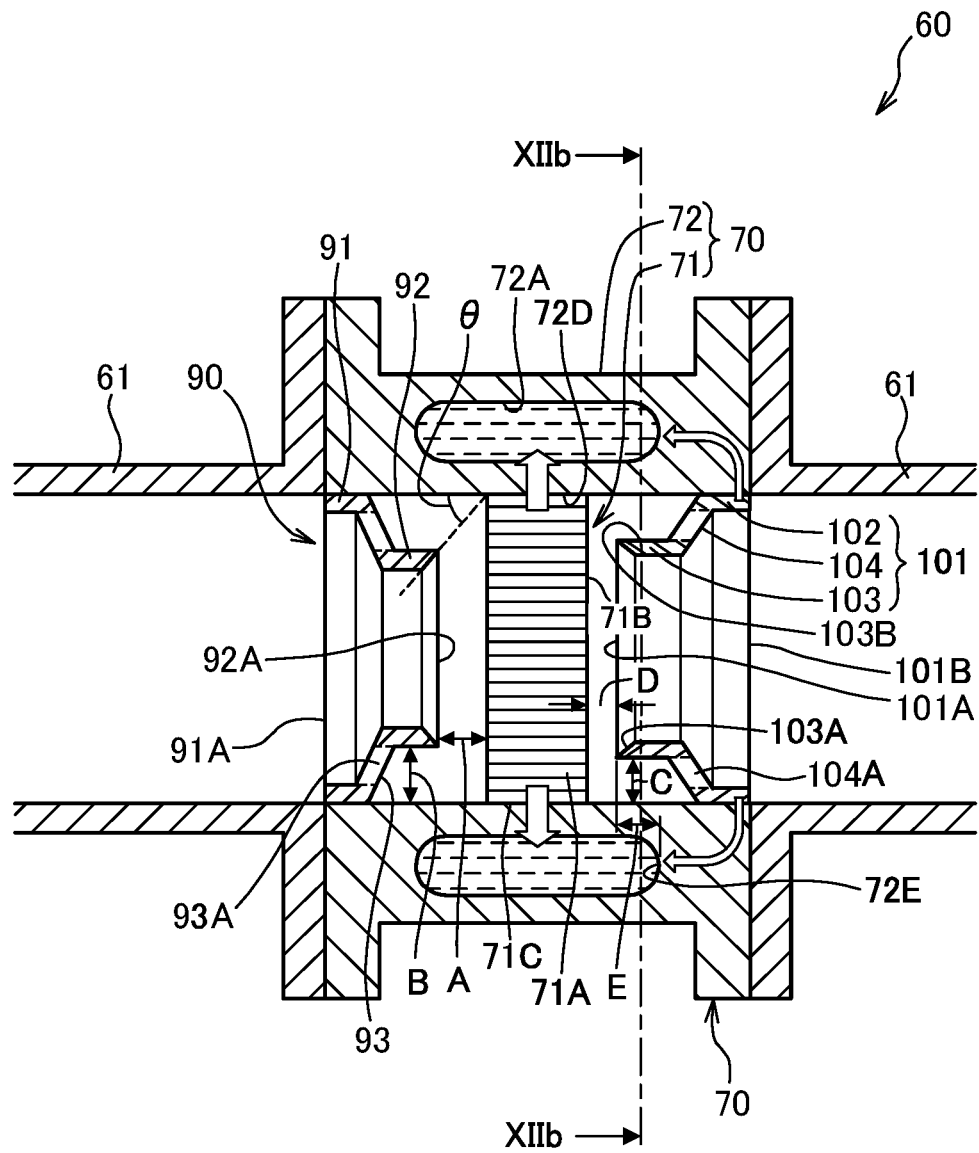
FIG. 15 is a cross-sectional view of an exhaust device of an engine according to an eighth embodiment.

The exhaust device 60 of the engine 1 according to an eighth embodiment of the present invention will be described with reference to FIG. 15. FIG. 15 is a cross-sectional view of the exhaust device 60 of the engine 1 according to the eighth embodiment.

The exhaust device 60 according to the eighth embodiment is different from the exhaust device of the seventh embodiment in that through-holes 93A are provided in the exhaust gas flow controlling member 90 and through-holes 104A are provided in the support member 101.

The through-holes 93A are formed in the same way as in the sixth embodiment shown in FIG. 11A. Also, the through-holes 104A are provided the same as the through-holes 93A. That is, the joint part 104 is provided with a plurality of through-holes 104A, like the through-holes 93A shown in FIG. 11B, along the circumference direction of the support member 101. The through-holes 104A are formed, like the through-holes 93A shown in FIG. 11A, to penetrate through the joint part 104. Note that the total opening area, which adds up all the opening areas of a plurality of through-holes 104A, is smaller than the opening area of the inlet port 101A. Consequently, the opening area of one through-hole 104A is smaller than the opening area of the inlet port 101A.

Given that the through-holes 104A are structured in this way, when the exhaust gas flow controlling member 90 is provided in the exhaust device 60, part of the opening region of at least one through-hole 104A is placed to be located below the lowest part of the upstream end 103A of the tip part 103 in the vertical direction.

The exhaust device 60 of the eighth embodiment provides the following advantages.

Here, exhaust gas from the exhaust heat collecting part 71 does not blow in the outer peripheral side of the gap D, and the exhaust gas from the exhaust heat collecting part 71 has difficulty finding its way to the outer peripheral side of the gap C. Consequently, the exhaust gas that stays on in the outer peripheral side of the gap C is little likely to be replaced by the exhaust gas from the exhaust heat collecting part 71, has its heat drawn away in the cooling part 72, and condenses.

Furthermore, the gap C is located in an outer peripheral portion further downstream of the inlet port 101A of the support member 101, so that very little of the exhaust gas that flows into the inlet port 101A finds its way to the gap C. Therefore, in the outer peripheral side of the gap C, exhaust gas is more likely to condense than in the gap D, and condensed water is more likely to pool.

In the exhaust device 60 of the eighth embodiment, exhaust gas in the gap C and the gap D flows from the through-holes 104A to the downstream side, and therefore can blow away the condensed water produced in the gap C and the gap D more efficiently. Also, since exhaust gas is discharged from a plurality of through-holes 104A incessantly and replaces the exhaust gas in the gap C and the gap D, it is possible to prevent exhaust gas from cooling down and producing condensed water.

With the exhaust device 60 of the eighth embodiment, through-holes 104A are formed at equal intervals along the circumferential direction of the support member 101, so that, when the exhaust gas flow controlling member 90 is provided in the exhaust device 60, part of the opening region of at least one through-hole 104A is located below the lowest position of the inlet port 101A of the support member 101 in the vertical direction. Consequently, at least one of a plurality of through-holes 104A that are provided is placed below the lowest part in the open end of the tip part 103 in the vertical direction, so that, even when condensed water is produced in the gap C and the gap D, the condensed water can be blown off. As a result of this, it is possible to prevent corrosion in the lowest part of the exhaust device 60.

Note that although FIG. 15 illustrates an example in which both through-holes 93A and through-holes 104A are formed, this is by no means limiting. One of the through-holes 93A and the through-holes 104A may be formed.

Also, the through-holes 104A may be provided in variations like the variations of the through-holes 93A described in the fifth embodiment and the sixth embodiment. For example, as has been shown in FIG. 10A and FIG. 10B of the fifth embodiment, it is possible to form through-holes 104A in the tip part 103 and the joint part 104 of the support member 101, which are provided in equal diameters, so that the through-holes 104A are placed in a part decentered from the central axis of the exhaust gas flow controlling member 90 and below the exhaust gas flow controlling member 90 in the vertical direction. Also, as has been shown in FIG. 12A of the sixth embodiment, the through holes 104A may be structured in a slot shape as shown in FIG. 12A or in a band shape as shown in FIG. 12B. Also, the through-holes 104A do not have to be round holes, and may assume a quadrangle shape.

Although the through-holes 104A are formed to penetrate the joint part 104, this is by no means limiting. The through-holes 104A may be provided to penetrate from the tip part 103 to the base part 102. Also, the through-hole 104A may be provided to penetrate through the tip part 103 and the joint part 104. Also, the through-holes 104A may be formed diagonally, may be formed in a shape other than a cylindrical shape, or may be formed so that the path draws a curved line.

Although embodiments of the present invention have been described above, the above-described embodiments only show part of the examples in which the present invention is applied, and should not be construed to limit the technical scope of the present invention to the specific structures of the above-described embodiments.

The present application claims a priority of Japanese Patent Application No. 2014-78161 filed with the Japan Patent Office on Apr. 4, 2014, and Japanese Patent Application No. 2014-152261 filed with the Japan Patent Office on Jul. 25, 2014, and all the contents of which are hereby incorporated by reference.

What is claimed is:

1. An exhaust device of an engine, with an exhaust path to lead exhaust gas discharged from the engine to outside, the exhaust device comprising:
    an exhaust heat collector, comprising an exhaust heat collecting part being configured to collect heat from the exhaust gas flowing in the exhaust path, and a cooling part being configured to cool down the exhaust heat collecting part from an outer peripheral side via a cooling fluid; and
    an exhaust gas flow controlling member in a cylindrical shape, comprising an inlet part which the exhaust gas flows into, and an outlet part where the inflow of the exhaust gas is discharged to an upstream side of the exhaust heat collecting part, wherein:
    an opening diameter of the outlet part of the exhaust gas flow controlling member is arranged to be smaller than an outer diameter of the exhaust heat collecting part;
    the exhaust gas flow controlling member is placed so that an open end of the outlet part opposes a central portion of an upstream end plane of the exhaust heat collecting part, and the open end of the outlet part and the upstream end plane of the exhaust heat collecting part are a predetermined distance apart;
    the exhaust gas flow controlling member is arranged so that the opening diameter of the outlet part is smaller than the opening diameter of the inlet part, and placed so that an inner wall plane of the exhaust path and an outer peripheral plane of the outlet part are apart; and
    the exhaust gas flow controlling member is provided so that an open end of the outlet part is placed in a downstream side of the upstream end of the cooling part of the exhaust heat collecting part.

2. The exhaust device of the engine according to claim 1, further comprising an exhaust tube connected to an upstream end of the exhaust heat collector,
    wherein the inlet part is fixed in the exhaust tube so that part of the inlet part projects into the exhaust heat collector.

3. The exhaust device of the engine according to claim 1, further comprising an exhaust tube connected to an upstream end of the exhaust heat collector,
    wherein the inlet part is fixed in the exhaust heat collector so that part of the inlet part projects into the exhaust tube.

4. The exhaust device of the engine according to claim 1, wherein the exhaust gas flow controlling member is placed so that an outer peripheral plane of the inlet part is exposed to the outside.

5. The exhaust device of the engine according to claim 1, wherein the inlet part projects outward in an axial direction from an end part of the exhaust heat collector so that an outer peripheral plane of the inlet part is exposed to the outside.

6. The exhaust device of the engine according to claim 1, further comprising a rectifier including a rectifying part to rectify the exhaust gas,
    wherein the rectifier is provided in an upstream side of the exhaust gas flow controlling member.

7. The exhaust device of the engine according to claim 6, wherein the rectifier is a catalyst converter comprising an exhaust gas purifying part to rectify the exhaust gas, and, furthermore, purify the exhaust gas.

8. The exhaust device of the engine according to claim 1, wherein, in a plane along a direction in which the exhaust path extends, an angle formed between a line connecting between an outer edge of the open end of the outlet part and an outer edge of the upstream end plane of the exhaust heat collecting part, and the inner wall plane of the exhaust path, is a value within a range of 10° to 45°.

9. The exhaust device of the engine according to claim 1, wherein:
    in the exhaust gas flow controlling member, a penetrating part to penetrate between the upstream side and a downstream side of the exhaust gas flow controlling member is formed in a location decentered from a central axis of the exhaust gas flow controlling member; and
    an opening area of the penetrating part is smaller than an opening area of the outlet part.

10. The exhaust device of the engine according to claim 1, further comprising a support member in a downstream side of the exhaust heat collecting part, the support member having an inlet port where the exhaust gas from the exhaust heat collecting part flows in, and an outlet port where the inflow of the exhaust gas is discharged,
    wherein: an opening diameter of the inlet port of the support member is arranged to be smaller than an outer diameter of the exhaust heat collecting part; and
    in the support member, an open end of the inlet port opposes a central portion of a downstream end plane of the exhaust heat collecting part, and, furthermore, the open end of the inlet port and the downstream end plane of the exhaust heat collecting part are a predetermined distance apart.

11. The exhaust device of the engine according to claim 10,
    wherein: in the support member, a penetrating part to penetrate between an upstream side and a downstream side of the support member is formed in a location decentered from a central axis of the support member; and
    an opening area of the penetrating part is smaller than an opening area of the inlet part.

12. The exhaust device of the engine according to claim 9,
    wherein a plurality of penetrating parts are formed along a circumferential direction of the exhaust gas flow controlling member.

13. The exhaust device of the engine according to claim 9,
    wherein the penetrating part is formed below the central axis of the exhaust gas flow controlling member in a vertical direction.

14. The exhaust device of the engine according to claim 13,
    wherein the penetrating part is formed so that part of an opening region of the penetrating part is located below a lowest part in an opening of the outlet part in the vertical direction.

15. The exhaust device of the engine according to claim 12,
wherein the penetrating parts are formed at equal intervals along the circumferential direction of the exhaust gas flow controlling member so that, when the exhaust gas flow controlling member is provided in the exhaust device, part of an opening region of at least one penetrating part is located below a lowest part in an opening of the outlet part in the vertical direction.

16. An exhaust device of an engine, with an exhaust path to lead exhaust gas discharged from the engine to outside, the exhaust device comprising:
an exhaust heat collector, comprising an exhaust heat collecting part being configured to collect heat from the exhaust gas flowing in the exhaust path, and a cooling part being configured to cool down the exhaust heat collecting part from an outer peripheral side via a cooling fluid; and
an exhaust gas flow controlling member in a cylindrical shape, comprising an inlet part which the exhaust gas flows into, and an outlet part where the inflow of the exhaust gas is discharged to an upstream side of the exhaust heat collecting part, wherein:
an opening diameter of the outlet part of the exhaust gas flow controlling member is arranged to be smaller than an outer diameter of the exhaust heat collecting part;
the exhaust gas flow controlling member is placed so that an open end of the outlet part opposes a central portion of an upstream end plane of the exhaust heat collecting part, and the open end of the outlet part and the upstream end plane of the exhaust heat collecting part are a predetermined distance apart;
the exhaust device further comprising an exhaust tube connected to an upstream end of the exhaust heat collector; and
wherein the inlet part is fixed in the exhaust tube so that part of the inlet part projects into the exhaust heat collector.

17. An exhaust device of an engine, with an exhaust path to lead exhaust gas discharged from the engine to outside, the exhaust device comprising:
an exhaust heat collector, comprising an exhaust heat collecting part being configured to collect heat from the exhaust gas flowing in the exhaust path, and a cooling part being configured to cool down the exhaust heat collecting part from an outer peripheral side via a cooling fluid; and
an exhaust gas flow controlling member in a cylindrical shape, comprising an inlet part which the exhaust gas flows into, and an outlet part where the inflow of the exhaust gas is discharged to an upstream side of the exhaust heat collecting part, wherein:
an opening diameter of the outlet part of the exhaust gas flow controlling member is arranged to be smaller than an outer diameter of the exhaust heat collecting part;
the exhaust gas flow controlling member is placed so that an open end of the outlet part opposes a central portion of an upstream end plane of the exhaust heat collecting part, and the open end of the outlet part and the upstream end plane of the exhaust heat collecting part are a predetermined distance apart;
the exhaust device further comprising an exhaust tube connected to an upstream end of the exhaust heat collector; and
the inlet part is fixed to the exhaust heat collecting part so that part of the inlet part projects into the exhaust tube.

* * * * *